(12) United States Patent
Jannarone et al.

(10) Patent No.: US 7,877,337 B2
(45) Date of Patent: Jan. 25, 2011

(54) AUTO-ADAPTIVE NETWORK FOR SENSOR DATA PROCESSING AND FORECASTING

(75) Inventors: Robert J. Jannarone, San Diego, CA (US); J. Tyler Tatum, Atlanta, GA (US); Jennifer A. Gibson, Atlanta, GA (US)

(73) Assignee: Brainlike, Inc., San Diego, CA (US)

( * ) Notice: Subject to any disclaimer, the term of this patent is extended or adjusted under 35 U.S.C. 154(b) by 695 days.

(21) Appl. No.: 11/907,259

(22) Filed: Oct. 10, 2007

(65) Prior Publication Data

US 2008/0126274 A1    May 29, 2008

Related U.S. Application Data

(60) Provisional application No. 60/850,279, filed on Oct. 10, 2006.

(51) Int. Cl.
G06F 15/18 (2006.01)
G06G 7/22 (2006.01)
(52) U.S. Cl. ............................ 706/14; 706/21; 706/28
(58) Field of Classification Search .................. 706/14
See application file for complete search history.

(56) References Cited

U.S. PATENT DOCUMENTS

| | | | |
|---|---|---|---|
| 5,966,178 A | 10/1999 | Tashima et al. | |
| 6,216,119 B1* | 4/2001 | Jannarone | 706/26 |
| 7,529,721 B2 | 5/2009 | Jannarone et al. | |
| 2006/0074741 A1 | 4/2006 | Orumchian et al. | |
| 2008/0097802 A1 | 4/2008 | Ladde et al. | |

FOREIGN PATENT DOCUMENTS

| | | |
|---|---|---|
| JP | 03-150916 A | 6/1991 |
| JP | 06-222809 A | 8/1994 |

OTHER PUBLICATIONS

International Search Report and Written Opinion for PCT/US06/27006 issued May 8, 2007.

Wu et al., Adaptive Nearest Neighbor Search for Relevance Feedback in Large Image Databases, ACM Multimedia, Oct. 5, 2001, pp. 89-97.

(Continued)

Primary Examiner—Donald Sparks
Assistant Examiner—Nathan H Brown, Jr.
(74) Attorney, Agent, or Firm—Stephen C. Beuerle; Procopio Cory Hargreaves & Savitch LLP

(57) ABSTRACT

In an auto-adaptive system, efficient processing generates predicted values in an estimation set in at least one dimension for a dependent data location. The estimation set comprises values for a dependent data point and a preselected number of spatial nearest neighbor values surrounding the dependent data point in a current time slice; The prediction may be made for time slices, seconds, hours or days into the future, for example. Imputed values may also be generated. A mean value sum of squares and cross product MVSCP matrix, inverse, and other learned parameters are used. The present embodiments require updating only one MVSCP matrix and its inverse per time slice. A processing unit may be embodied with selected modules each calculating a component function of feature value generation. Individual modules can be placed in various orders. More than one of each type of module may be provided.

17 Claims, 28 Drawing Sheets

OTHER PUBLICATIONS

McBader et al., A Programmable Image Processing Architecture for Embedded Vision Systems, Proc. 14th IEEE International Conference on Digital Signal Processing, DSP 2002, Jul. 3, 2002, pp. 1269-1272.

Sun, Motion Activity for Video Indexing, Ph.D. Thesis, University of California, Santa Barbara, Jun. 2004, entire document, especially fig 5-1, p. 92.

International Search Report and Written Opinion for PCT/US2008/064276 issued Dec. 18, 2008.

Gao et al., Evaluating Continuous Nearest Neighbor Queries for Streaming Time Series via Pre-fetching, 2002.

U.S. Appl. No. 12/412,680, filed Mar. 27, 2009, Jannarrone et al.

U.S. Appl. No. 12/432,514, filed Apr. 29, 2009, Jannarron et al.

* cited by examiner

B. Processing unit executive routine

240

Begin — 242

B.1. (optionally) Initialize API / reset config — 244

B.2. (optionally) Organize parallel processing — 246

B.3. Call processing unit(s) — 248

B.4. (optionally) Collect parallel outputs into API — 250

B.5. (optionally) Free parallel pipes — 252

B.6. (optionally) Save core — 254

Return — 256

Fig. 5

| Rappper input time slice: | Input stage input (and step 2 output) time slice | screener feature input (and step 2 output) time slice | screener kernel time slice input (and step 2 output) time slice | correlator feature time slice input (and step 2 output) time slice | correlator kernel time slice input (and step 2 output) time slice | forecaster input time slice | forecaster step 2 output forecast time slice | output processor time slice input |
|---|---|---|---|---|---|---|---|---|
| 1 | 1 | | | | | | | |
| 2 | 2 | 1 | | | | | | |
| 3 | 3 | 2 | 1 | | | | | |
| 4 | 4 | 3 | 2 | 1 | | | | |
| 5 | 5 | 4 | 3 | 2 | 1 | | | |
| 6 | 6 | 5 | 4 | 3 | 2 | 1 | | |
| 7 | 7 | 6 | 5 | 4 | 3 | 2 | 1 | |
| 8 | 8 | 7 | 6 | 5 | 4 | 3 | 2 | 1 |
| 9 | 9 | 8 | 7 | 6 | 5 | 4 | 3 | 2 |
| 10 | 10 | 9 | 8 | 7 | 6 | 5 | 4 | 3 |
| • | • | • | • | • | • | • | • | • |
| • | • | • | • | • | • | • | • | • |
| • | • | • | • | • | • | • | • | • |

Fig. 11

Features vs. Time with No Space Dimensions (only one window):

DEPENDENT CELLS: | D |

INDEPENDENT CELLS: | I |

FRAME CELLS: | F |

| | | | |
|---|---|---|---|
| Input features per cell, n_features_in_per_cell: | 8 | | |
| Window time slices, n_window_time_slices: | 3 | | |
| Model space slices, n_model_space_slices: | 1 | 1 | 1 |
| Window space slices, n_window_space_slices: | 1 | 1 | 1 |
| Frame size: | 0 | 0 | 0 |

Feature Slices:

| | | 0 | 1 | 2 | 3 | 4 | 5 | 6 | 7 |
|---|---|---|---|---|---|---|---|---|---|
| | Now-2 | I | I | I | I | I | I | I | I |
| Time Slices: | Now-1 | I | I | I | I | I | I | I | I |
| | Now | D | D | D | D | D | D | D | D |

Fig. 13

Fig. 16 part 1 of 2

Fig. 16 part 2 of 2

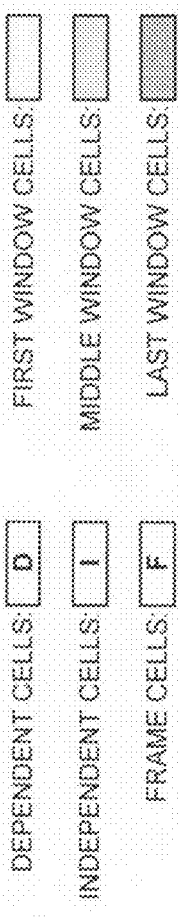
Fig. 17 part 1 of 5

Fig. 17 part 2 of 5

Fig. 17 part 3 of 5

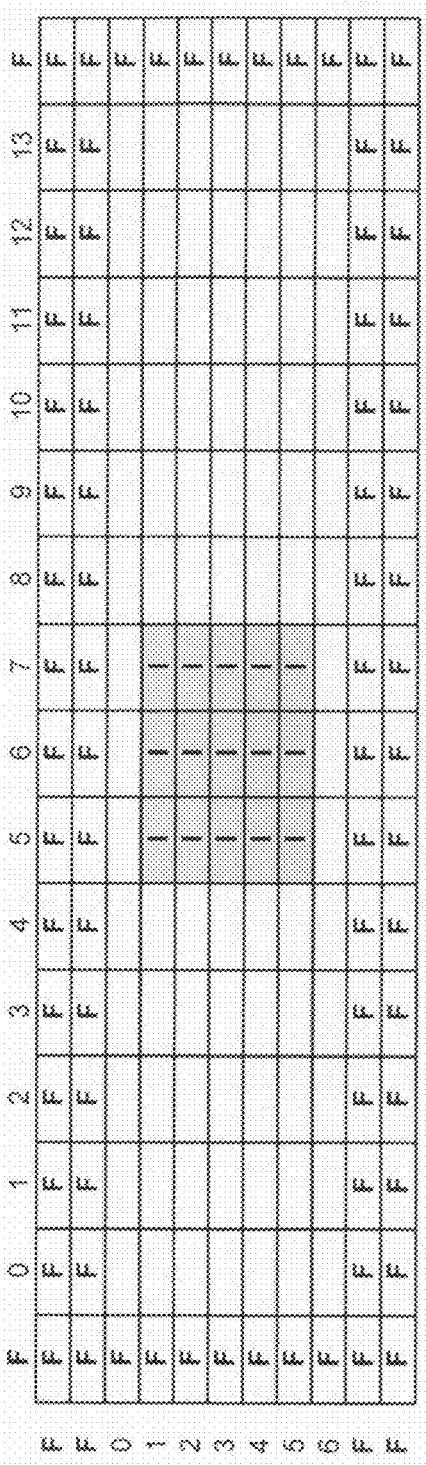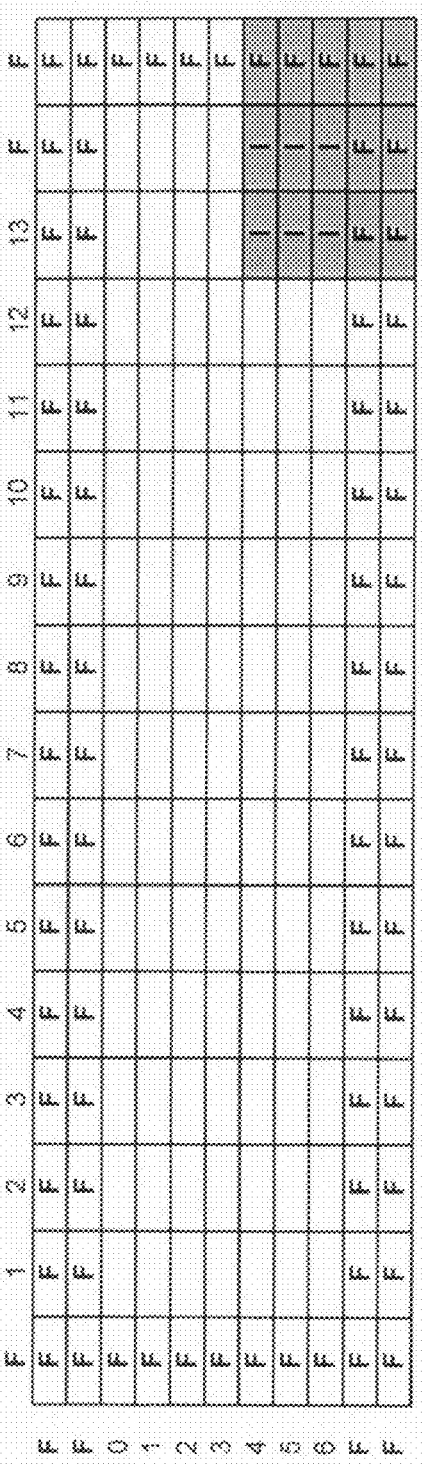
Fig. 17 part 4 of 5

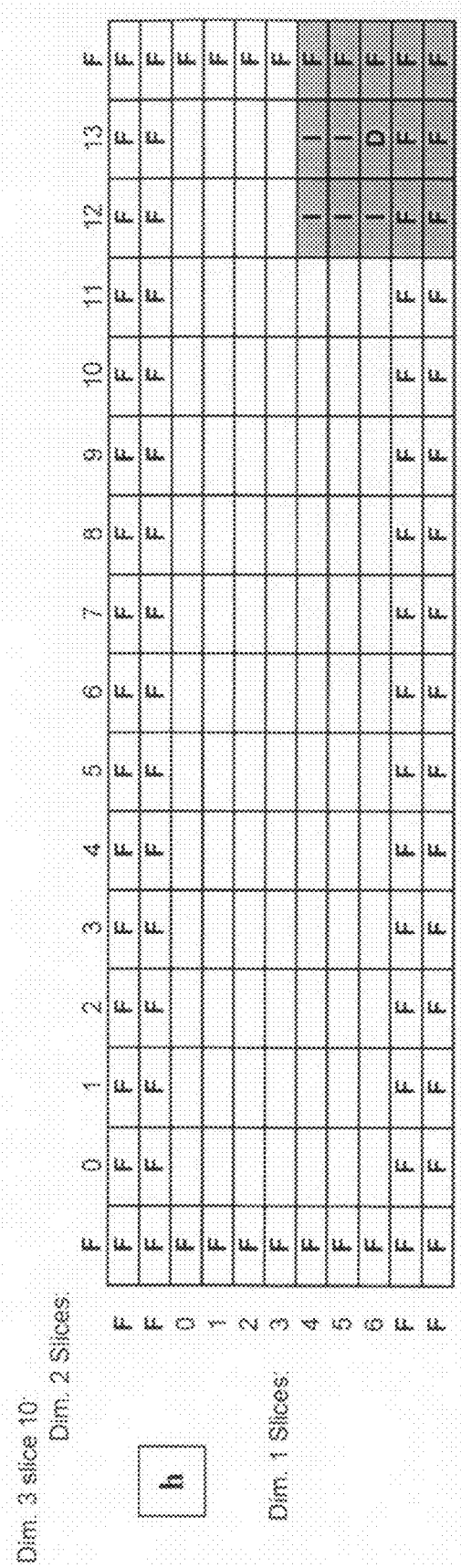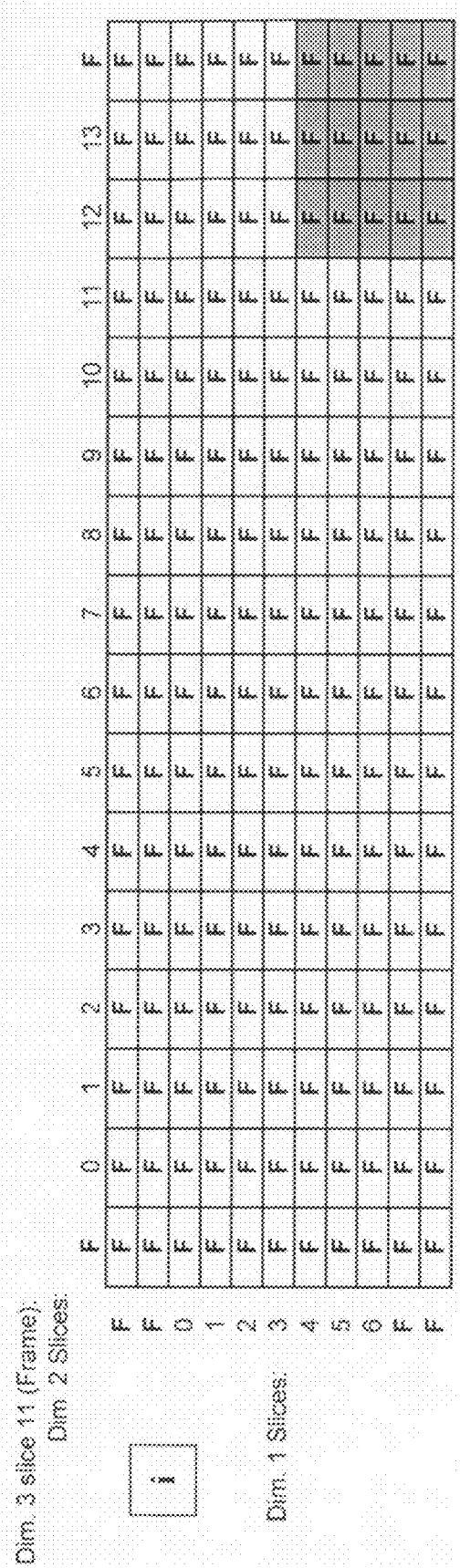
Fig. 17 part 5 of 5

STEP 1: UPDATE FORECASTING MSVCP CROSS-PRODUCT VALUES

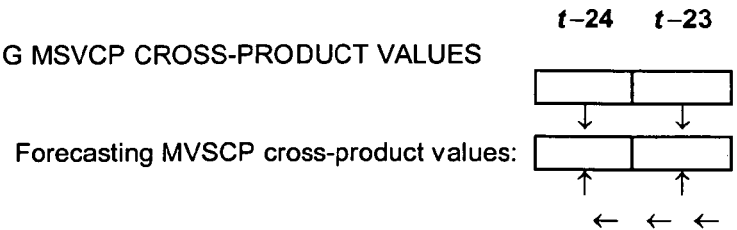

Forecasting MVSCP cross-product values:

STEP 2: COMPUTE FORECASTING WEIGHTS

Forecasting MVSCP cross-product values:

Forecasting packet MVSCP matrix inverses:

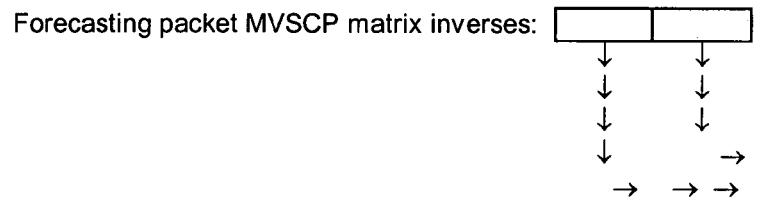

STEP 3: COMPUTE FORECAST VALUES

Current register

STEP 4: UPDATE FORECASTING MSD VALUES

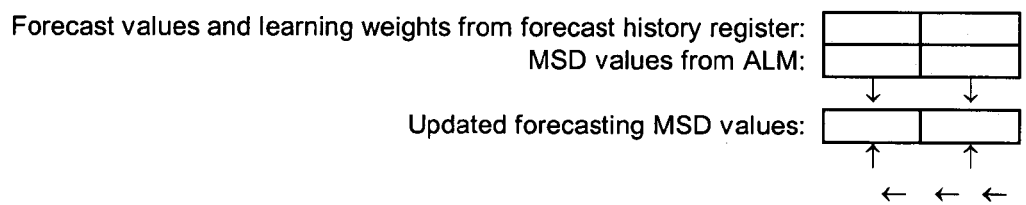

Forecast values and learning weights from forecast history register:
MSD values from ALM:

Updated forecasting MSD values:

STEP 5: UPDATE FORECAST HISTORY REGISTER VALUES

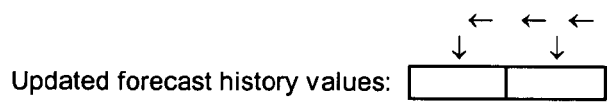

Updated forecast history values:

Fig. 21(a)

AUTO-ADAPTIVE NETWORK FOR SENSOR DATA PROCESSING AND FORECASTING

CROSS REFERENCE TO RELATED APPLICATION

The present application claims priority of U.S. Provisional Patent Application Ser. No. 60/850,279, filed Oct. 10, 2006 which is incorporated by reference herein in its entirety.

FIELD OF THE INVENTION

The present subject matter relates generally to machine learning and more specifically to efficient processing of parameter values, which may be multi-dimensional, for predicting feature values as well as for use in calculating imputing values for a range of applications providing auto-adaptive functions.

BACKGROUND OF THE INVENTION

Auto-adaptive systems have many applications. These applications include event recognition based on data measured over a number of successive time periods. Events take many different forms. For example, events may include detection of a target in a particular area, sensing of an out-of-specification condition in a physical process environment or correspondence of processed psychometric measurements with a particular behavior prediction profile. Anomaly sensing is often an element of detecting an event. Event recognition may also comprise evaluation of sensed data to recognize or reject existence of conditions indicated by the data or to initiate a particular action.

Signals are produced in response to sensor outputs, and the signals are processed. A number of processing stages may be used. Processing results are used, for example, in known functions for calculating, predicting and imputing values, updating learned functions, assigning plausibility to measurements, discerning deviance between measured and expected values and event detection. Commonly, a display is used to convey information to a user.

Commonly assigned, copending U.S. patent application Ser. No. 11/484,874 (the '874 application), which is incorporated by reference herein in its entirety, provides, inter alia, significant improvements in processing capacity for auto-adaptive networks that may be embodied in field programmable gate arrays (FPGAs). Consequently, powerful anomaly detection techniques may be practiced on portable systems that are remote from a base station. One example of a portable system is an unmanned aerial vehicle (UAV).

The '874 application provides a context that comprehends a method of forecasting future feature values for a cell of a data array and a processor system wherein an array of data collected over successive time slices is processed, with a plurality of data points being provided during each time slice, a number of future time slices is specified for which to forecast a feature value, each future time slice being located a number of time slices into the future from a current reference point; a number of forecasts per feature is specified; a set of past time slices to be utilized for each prediction is defined, each said past time slice being located a number of time slices in the past away from the current reference point corresponding to a number or time slices away from the current reference point of a future time slice and defining a number of features for each data point.

SUMMARY OF THE INVENTION

Embodiments of the present invention utilize a covariance matrix, a mean value sum of squares and cross product (MVSCP) matrix, their inverse matrices, and other learned parameters that have been previously used. Prior embodiments have disclosed use of these parameters for estimating current imputed values. Embodiments of the present invention, however, utilize these values to generate forecasts. In embodiments of the present invention, efficiencies of the correlator disclosed in the '874 application are utilized to provide a more powerful processor. The present embodiments require updating only one MVSCP matrix and its inverse per time slice. Likewise, the present embodiments require updating only one covariance matrix and its inverse per time slice. A separate update to generate a current imputed value is not required.

In the above-described context, embodiments of the present invention comprise a method of generating predicted values defining a current estimation set in at least one dimension for a dependent data location for which a value will be predicted, said estimation set comprising the dependent data location and a preselected number of nearest neighbor values surrounding the dependent data point in a current time slice; accessing estimation sets from each of a preselected number of time slices corresponding to said current estimation set; associating one estimation set with each dimension; generating a set of learned parameters comprising values produced by a function incorporating either a MVSCP matrix or a covariance matrix for each estimation set associated with a set of past time slices; and updating each learned parameter to compute a forecasting weight. A processor is also provided.

In a further form, a graphical deviance display is provided for deviance values between expected and measured parameters. The subject graphical display converts deviance magnitude values on a two-dimensional grid. Independent values for the conversion include deviance magnitude values, ranging from a configured positive value to a second, larger configured value. Corresponding dependent values for the conversion would be colors along a spectrum mapped on the same grid. The relationship between the magnitudes and wavelength values corresponding to the colors would be monotone increasing, as specified by the user. One function of the adaptive learning processor in the generation of deviance values between an expected value of a cell and a calculated value.

In a further form, a processor is embodied of modules that may be embodied by components such as FPGAs processing feature values using selected modules. Each module calculates a component function of feature value generation. Individual modules can be placed in a selected order, and more than one of each type of module may be provided.

In selected further embodiments, learning parameters may be generated based on calculations utilizing groups of values from successive windows within a single time slice. A window is a group of values for each of a particular data point and a preselected number of spatial nearest neighbors.

Another aspect of embodiments of the present invention provides for data compression. In one form, a system transmits one out of every N full sets of data arrays, e.g., images, where N is a natural number. Learning parameters are also transmitted. Consequently a base station may receive sufficient input information to generate data arrays at times between reception of each $N^{th}$ data array. Consequently, requirements for remote transmitters for such parameters and bandwidth and power may be reduced.

BRIEF DESCRIPTION OF THE DRAWINGS

The present subject matter may be understood by reference to the following description taken in connection with the following drawings.

FIGS. 4 through 9 are each a flow diagram illustrating a performance of modular statistical routines within the processing unit;

FIG. 11 is a chart illustrating values from various time slices during a current selected time slice t0;

FIGS. 13-15, 16A-16C, and 17A-17I are each a chart useful in illustrating selection of members of sets of data, called estimation sets, to be used in successive calculations of a recursive function;

DETAILED DESCRIPTION

Figure 1:
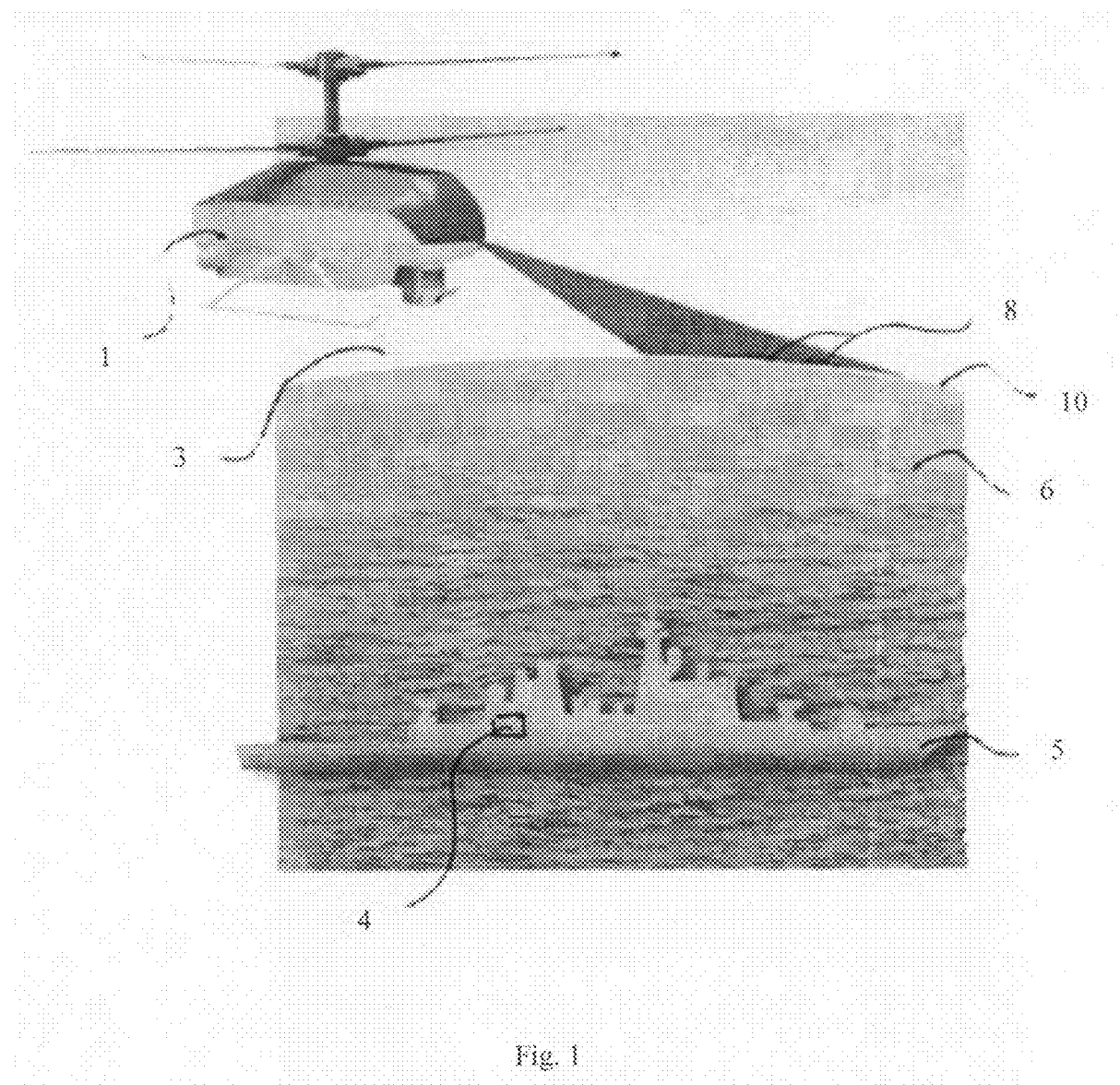
FIG. 1 is an illustration of a UAV employing an embodiment of the present invention gathering data and transmitting intelligence to a command and control station.

Embodiments of the present invention provide for operation referred to as auto-adaptive processing. Auto-adaptive processing is not a recognized term of art, but is descriptive of processing of data, often condition-responsive data received from an array of sensors received in successive time slices, in order to update adaptive functions and to calculate imputed values of data for use in evaluating data and which may also be used to predict data. Time slices may also be referred to by such terms as clock periods or data cycles. For each time slice, measurement values and measurement plausibility values are supplied to the system, and a learning weight is either supplied to or generated by the system. While the above-cited '874 application focuses on producing estimations, present embodiments provide novel ways of forecasting values at future times, which may occur milliseconds, hours or days after a current time slice.

Auto-adaptive processing operations may include converting measurement values to feature values; converting measurement plausibility values to feature viability values; using each viability value to determine missing value status of each feature value; using non-missing feature values to update parameter learning; imputing each missing feature value from non-missing feature values and/or prior learning; converting imputed feature values to output imputed measurement values; and supplying a variety of feature value and feature function monitoring and interpretation statistics.

The above operations are performed by applying functions to selected data entries in a data array. Embodiments of the present invention utilize a "windowing" function in order to "index" through the data array to select successive groups of data entries for processing. Field programmable windowed functionality can be applied to many applications by programming the data entries to be utilized for a calculation and to set parameters of algorithms.

Embodiments of the present invention in one form provide for the option of embodying an auto-adaptive processor in the form of parallel, pipelined adaptive feature processor modules that perform operations concurrently. Tasks including, function monitoring, interpretation and refinement operations are done in parallel. Distribution of tasks into modules permits the use of simplified hardware such as FPGAs, as opposed to full processors in various stages. Auto-adaptive processing may be utilized for tasks that were previously considered to be intractable in real time on hardware of the type used in low powered, portable processors. The option of modular pipelined operation simplifies programming; design and packaging and allows for use of FPGAs in place of high-powered processors. Stationary learned parameter usage, based on the same estimation functions and learned parameter values, can be used to produce the estimates that in turn allow unexpected events to be detected more simply.

Embodiments of the present invention may be used in a very wide variety of applications. These applications include disease control, military attack prevention, measuring efficacy of antibiotics, detecting un and monitoring system performance to prevent breakdowns. Event recognition may be used to trigger an alarm and initiate a response or produce a wide variety of other reactive or proactive responses. In one application, usability of data is evaluated so that a remote device may decide whether or not to utilize its limited power and bandwidth to transmit the data.

Figure 2:
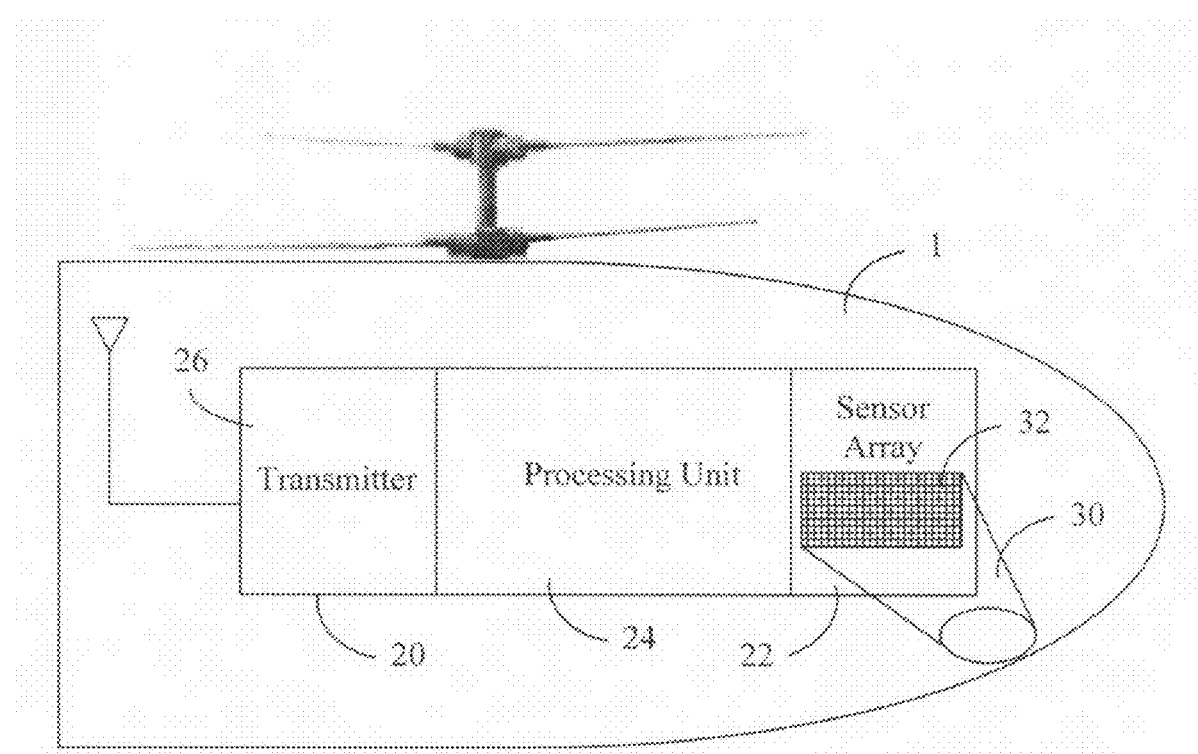
FIG. 2 is a block diagram of a system incorporating an embodiment of the present invention.
Figure 3:
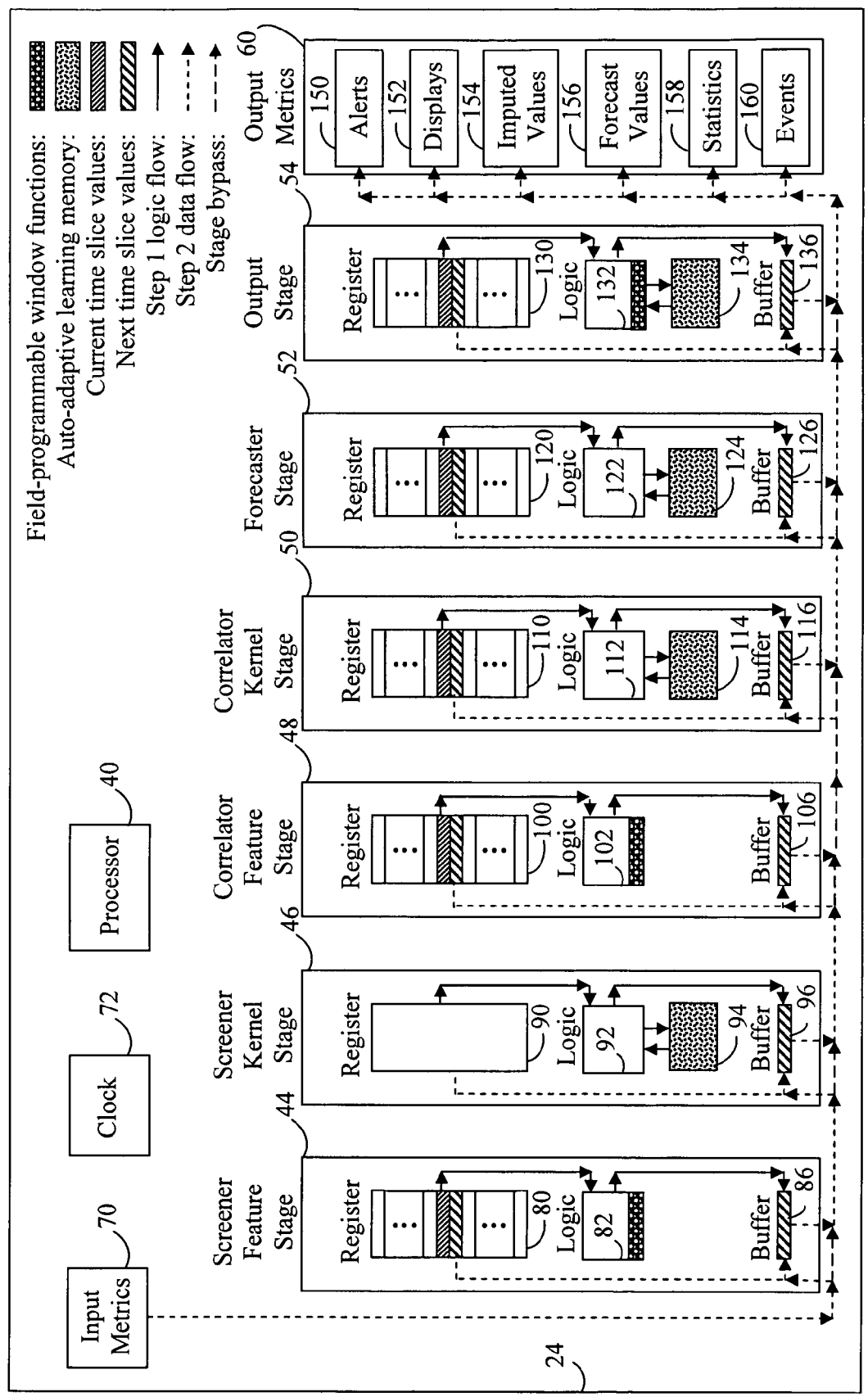
FIG. 3 is a block diagram of one form of processing unit included in the embodiment of FIG. 2.
Figure 21B:
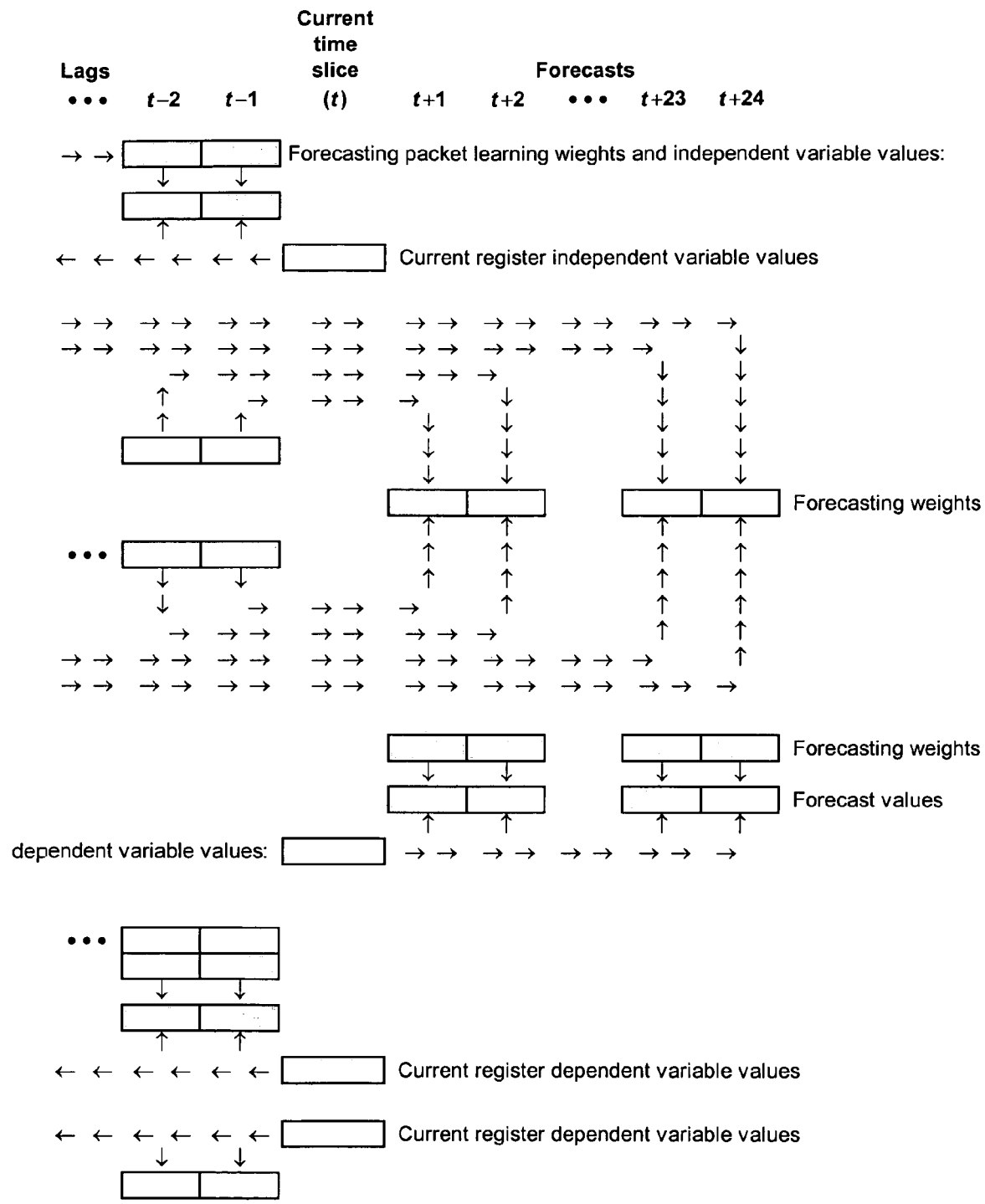
FIG. 21, consisting of FIGS. 21A and 21B, is a forecasting steps worksheet.
Figure 22:
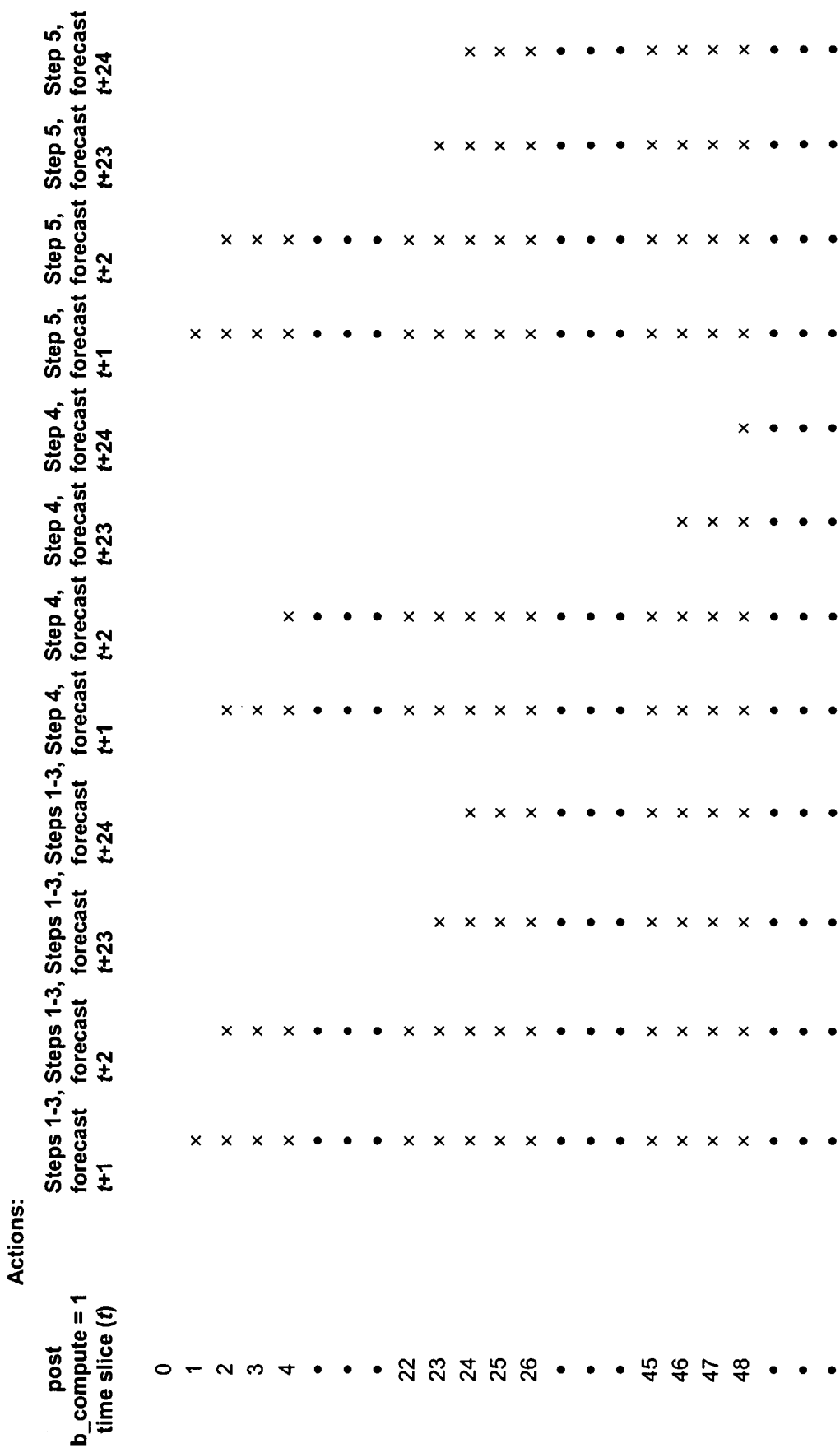
FIG. 22 is a forecasting sequence worksheet.

In the present description, FIGS. 1-3 describe hardware. FIGS. 4-20 describe a processor environment for producing estimated functions. This processor may provide a context for present embodiments. FIGS. 21 and 22 are particularly directed to forecasting embodiments. FIGS. 21 and 22 are discussed prior to a discussion of FIGS. 4-20.

One of the many applications for systems including an embodiment of the present invention is illustrated in FIG. 1. In this illustration, an unmanned aerial vehicle (UAV) 1 is part of an intelligence system. The UAV 1 comprises an array of sensors, processors and a transmitter, further described and illustrated below. The UAV 1 provides video information via a radio frequency link 3 to a base station 4. In the present illustration, the base station 4 is housed in a ship 5. The ship 5 is traveling in an ocean 6. The UAV 1 may detect enemy craft 8. The enemy craft 8 may be beyond a horizon 10 of the ship 5. The transmitter within the UAV 1 must have sufficient bandwidth to provide detected video information to the base station 4. Data processing equipment and transmitter modulation circuitry must have sufficient capacity to transmit video information. Ideally, all video information provided from the UAV 1 to the base station 4 will be useful. To the extent that the base station 4 will be receiving non-useful information, the base station 4 will have to expend resources to call the non-useful information. Processing of non-useful information at the base station 4 will also slow the response to useful information.

Ambient conditions will have a tendency to obscure the view of the enemy craft 8 from the UAV 1. Moisture in the air is a common ambient condition. Very often, moisture in the air will not be sufficient to block obtaining a useful image. Optical filtering may also be used to reduce haze. However, clouds or rainstorms may be located between the enemy craft 8 and the UAV 1. The video data obtained when the enemy craft 8 are not viewable is referred to in the present description as non-useful information. Commonly, UAVs simply collect data and transmit the data to a base station. The UAV 1 must be provided with sufficient resources to transmit non-useful information. In accordance with embodiments of the present invention, data processing is done to determine whether information will be useful or not. One criterion that need be utilized to determine whether information is useful is a contrast level in an image sensed by the UAV 1. An image of cloud cover will have low contrast, while a useful image of the enemy craft 8 will include objects that have contrast with respect to their backgrounds. By preventing transmission of non-useful information, circuitry in the UAV 1 may be designed to have less robust circuitry and lower power requirements then a circuit which must also transmit non-useful information. Capacity of transmission of useful information and speed of transmission use increased. The resulting decrease in total transmission of information permits the use of simpler circuitry and lowers power requirements. The efficiency and reliability of processing at the base station 4 is also increased.

The present system comprises a rapid learning system. A rapid learning system performs adaptive learning, as a neural network. Additionally, the rapid learning system and monitors, forecasts or controls data in real-time. The present specification is described in the context of the art of neural networks and adaptive systems. There is a wide range of literature further describing the basis for mathematics utilized here in and the construction and performance of learning systems. Further background will be provided by R. J. Jannarone, Concurrent Learning and Information Processing, Chapman & Hall, New York, 1997.

A general block diagram of the system incorporating an embodiment of the present invention is shown in FIG. 2. The UAV 1 comprises an electronics unit 20 including a sensor array 22, a processing unit 24 and a transmitter 26. In the present illustration, the sensor array 22 comprises a video camera 30 having an array of pixels 32, each providing an output indicative of light focused on the pixel 32. The present embodiments may process measurements that are one-dimensional or multi-dimensional. A one-dimensional output could comprise a gray-scale level wherein a single value is indicative of pixel output. Alternatively, a plurality of values may represent output of one pixel, such as gray-scale level and color levels. The sensor array 22 provides data to the processing unit 24. The processing unit 24 provides video output to the transmitter 26.

The present embodiments will achieve the necessary functions to produce meaningful output data as in the prior art. However, as further described below, the present embodiments will have a greater generality, efficiency, and affordability as compared to prior art in embodiments. Since speed and capacity of the system are vastly improved with respect to the prior art, a depth of processing is made available in applications where it could not be used before, for example, real-time video processing of entire rasters at many frames per second. New market segments for adaptive processing are enabled.

Data is gathered in successive time slices. The greater the temporal resolution of the data gathering, the shorter the period of each time slice will be. In order to provide for adaptive processing, data received from each of a plurality of sensors during successive time slices will be processed. The functions performed by the present embodiments include receiving input values in consecutive time slices and performing processing operations during each time slice. These operations may include estimating each input value from current and prior input values through the use of a correlation matrix; comparing each estimated value to its actual value to determine whether or not the actual value is deviant; replacing deviant or missing input values with their estimated values as appropriate; and updating learned parameters. Updating all learned parameters is important, because it allows event recognition criteria to be continuously, automatically, and adaptively updated over time.

FIG. 3 is a block diagram of the processing unit. Operation of each of the modules 44 through 60 is described further below with respect to FIGS. 4-9. Structure of these modules is described with respect to FIG. 3. It should be noted that the name of each module in FIG. 3 is selected for description in context of the present illustration, and does not constitute a particular limitation with respect to structure or operation. The modules 44 through 60 are connected to provide data or other signals either in series or pipelined to successive stages. Particular connections are controlled by the program module 42. The connections are programmed to provide the operation described in FIGS. 4-9 below. FIG. 3 is first described with respect to the hardware therein and how estimating functions are achieved. Forecasting in accordance with present embodiments is explained.

The modules 44 through 60 each have an input terminal connected to a register 80, 90, 100, 110, 120 and 130 respectively. The registers 80, 90, 100, 110, 120 and 130 each respectively provide an input to logic units 82, 92, 102, 112, 122 and 132 from the logic units 92, 112, 122 and 132 respectively. First through sixth buffers 86, 96, 106, 116, 126 and 136 receive data from the logic units 82, 92, 102, 112, 122, and 132 respectively. Additionally, in the modules 46, 50, 52 and 54, auto adaptive learning memory units 94, 114, 124 and 134 are interactively connected with the logic units 92, 112, 122 and 132 respectively.

Each of the buffers 86 through 136 provides an output to each respective successive module and to the output metrics module 60. The output metrics module 60 includes registers for functions selected by a user. In the present illustration, registers 150, 152, 154, 156, 158 and 160 are provided. These registers may respectively receive alert information based on comparison to a threshold or other signature, displays, even to take values, forecast values, statistics, and events. The events register 160 responds to selected criteria, for example, a preselected degree of deviation of a measured value from an expected value.

Input values and calculated values are provided from the input metrics circuit 70. For example, a side scan sonar receiver may include 512 sensors in a row. A number of spatial dimensions for the side scan sonar row is one. Dimensions may be spatial, temporal or may be indicative of each a multiplicity of values associated with each cell, e.g., temperature.

Calculated values are generated to describe the data. The calculated values are functions of input values selected to reveal information about a collected set of data. In the present illustration, the calculated values include four screener features per cell. Screener and correlators features are functions that are designed to discriminate improbable or out-of-range data input points from background clutter. Screener and correlator features provide measures of deviance between actual and expected feature values. In one form of processing of side scan sonar values, a set of functions has been developed for distinguishing presence or absence of a target and whether the target is a Type 1 target or a Type 2 target. In one form, a Type 1 target is indicated when a first pair of feature deviance values is large, and a Type 2 target is indicated when a second pair of feature deviance values is large. Both pairs will have a small deviance value in the absence of a target.

The provisional specification describes a forecaster, color-coded deviance graphics, and generalized stage specifications. The present embodiments may be incorporated in the context of the '874 application as well as in other environments. A brief, qualitative overview of the operation of the processing unit 24 in FIG. 3 is first taken. Components are described with respect to their antecedents in the '874 application. The processing unit is embodied of modules that may be embodied by components such as FPGAs processing feature values using selected modules. Each module calculates a component function of feature value generation. Individual modules can be placed in a selected order, and more than one of each type of module may be provided.

The input metrics circuit 70 provides input signals derived from sources, usually sensors, for processing by a processing unit 24. The screener feature stage 44 and the screener kernel stage 46 condition the inputs from the input metric circuit 70 used in statistical processing. The screener kernel stage 46 generates deviation values between measured and predicted values. The correlator feature stage 48 further processes deviance and plausibility values for selected time slices. The forecaster stage 52 in one form uses the same current and recent feature values for prediction as the correlator kernel stage 50 uses for imputing.

Values from the correlator stage register 110 are translated through the buffer 114 and are encapsulated in a forecast packet delivered to the register 120. A forecast packet register is embodied in the register 120. The forecasting packet may include values such as a MVSCP matrix. A forecaster will commonly include a routine for producing mean squared deviance (MSD) values. The forecaster stage produces learned cross-product parameters as part of the forecasting process.

Forecaster

During each time slice, the forecaster computes one or more forecast values for each feature in each cell. For all correlator kernel configurations, the forecaster can be configured to predict a broad variety of future values at every time slice. For example, the forecaster may be configured to predict each feature value 1, 2, or 3 time slices into the future; or alternatively, it may be configured to predict each feature value 1, 2, 23 or 24 time slices into the future. To provide this kind of variety, this forecasting specification includes the number of forecasts to be computed per feature as well as the number of time slices into the future for which each such forecast is to be produced.

Forecasting resembles correlator kernel imputing in three ways. First, the forecaster uses the same independent feature window configuration as the correlator kernel. In either case, independent feature time slices can be configured to include a broad variety of previous values. For example, independent variables may include features observed 1, 2, or 3 time slices ago; alternatively, they may include features observed 1, 2, 23 and 24 time slices ago; and so on.

Second, in order to compute forecasts, the forecaster uses learned parameters from the correlator kernel including MVSCP matrix values and MVSCP inverse values. Likewise, the present embodiments require updating only one covariance matrix and its inverse per time slice. Third, the forecaster operates in either the one-window mode or the many-windows mode, closely resembling the correlator kernel. When operating in either the one-window or the many-windows mode, forecaster estimates use practically the same window function structure as the correlator kernel for managing independent variable values during estimation.

Forecaster operation also differs from correlator kernel operation in three ways. First, the forecaster predicts future values for prospective decision-making and control. By contrast, the correlator kernel imputes current values for deviance detection and deviant or missing value replacements. Second, the forecaster updates learned estimation weights first and then uses them to compute estimation weights. By contrast, the correlator kernel computes estimation weights from the previous time slice first, then uses them for estimation, and then updates estimation weights. Third, the forecaster updates learned forecasting cross-product parameters in order to compute forecasting weights. By contrast, the correlator kernel updates MVSCP parameters in order to compute imputing weights.

The forecaster uses the same current and recent feature values for prediction as the correlator kernel uses for imputing. However, the forecaster computes distinct forecasting weights for every future time slice. In order to do so, the forecaster uses learned MVSCP or covariance matrix inverse values, deviance values, learning weights, and other values that were computed previously by the correlator kernel. The correlator kernel supplies one set of such values at the end of each time slice to the forecaster in the form of a forecasting packet. The forecaster uses one such packet to compute forecasting cross-products for each set of future forecasts. The forecaster then uses those cross-products as well as inverse values from the correlator kernel to compute forecasting weights.

The forecaster obtains its independent variable values from the correlator kernel register. In addition, the forecaster manages its own, forecasting packet register, containing forecasting packets from the correlator kernel. The forecaster must store as many such packets as the farthest number of future time slices to be forecast. For example, in order to predict feature values 1, 2, 23, and 24 time slices into the future, the forecaster must use each forecasting packet that the correlator kernel produced 1, 2, 23, and 24 time slices ago. In order to do so from one time slice to another, the forecaster must store all packets from one time slice ago to 24 time slices ago in its packet register. For efficiency, the packet register may comprise a daisy wheel register for storage management, just as other stages that employ recent history manage their own registers.

When forecasting is enabled, the correlator kernel produces a forecasting packet at the end of each time slice. The packet contains MVSCP matrix, inverse matrix, current deviance, learning weight values and other values that the forecaster uses for prediction, as outlined next, described in a separate section below, and described in statistical terms elsewhere.

During each time slice and for each forecast into the future, the forecaster completes four steps:
Updating MVSCP cross-products or covariance values
Computing forecasting weights
Computing forecast values
Updating forecast MSD values
Saving forecast values FIG. 21,
Each of these steps will be explained for the above illustration with respect to FIG. 21, forecasting steps worksheet, consisting of FIGS. 21A and 21B.

In the worksheet and the remainder of this section, forecasts 1, 2, 23, and 24 time slices ago are labeled forecast t+1, t+2, t+23, and t+24, respectively. During step 1), the forecaster updates four sets of MVSCP cross-products, using independent feature values that were observed 1, 2, 23, and 24 time slices ago, along with current feature values as shown. These independent feature values, along with corresponding learning weight values and MVSCP or covariance matrix inverse values are obtained from forecasting packets, as shown in the forecasting_steps worksheet. In order to produce bona fide, weighted least squares forecasting weights and forecasts, these cross-products are updated in precisely the same sequence that was used to update their corresponding inverse matrix. For the same reason, the cross-products are based on precisely the same learning weights as well as independent variable values as those that were used to update the corresponding inverse matrix.

During step 2), forecasting weights are computed as a function of MVSCP cross-product or covariance and MVSCP or covariance inverse values. Weights for predicting values one time slice into the future are based on cross-products and inverses corresponding to one time slice ago; weights for predicting values two time slices into the future are based on cross-products and inverses corresponding to two time slices ago; and so on.

During step 3), forecast values are computed as a function of current feature values and forecasting weights. Current feature values along with weights for predicting values one time slice into the future are used to forecast values one time slice into the future; current feature values along with weights for predicting values two time slices into the future are used to forecast values two time slices into the future; and so on.

During step 4), forecasting MSD values are updated based on squared differences between the current dependent feature values and their corresponding forecasts, along with learning weights that were used to produce the forecasts. As shown in FIG. 21, MSD values for forecasts one time slice into the future are based on corresponding forecasts and learning weights from one time slice ago; MSD values for forecasts two time slices in the future are based on corresponding forecasts and learning weights from two time slices ago; and so on.

During step 5, forecast values are saved into one or more forecast history registers. One such register is required for each prediction time slice, and its size depends on the time slice. For the above example, the register for predicting one time slice into the future must contain forecasts for predicting one time slice into the future that were computed currently; the register for predicting two time slices into the future must contain forecasts for predicting two time slices into the future that were computed currently and one time slice ago; and so on. In this way, the register for each prediction time slice will contain the required forecasts for updating MSD values during the next time slice.

The forecaster must wait longer to begin updating MSD values than to begin other functions. Also long-term forecasts must begin later than near-term forecasts. These distinctions are shown in FIG. 22, which is a forecasting sequence worksheet, for the above example based on four forecasts. Steps 1 through 3 can be performed after only one time slice for forecast t+1, but steps 1 through 3 can only be performed two time slices afterwards for forecast t+2, and so on. Step 4 delays are twice as long, because computing MSDs requires waiting until not only forecasts have been computed but also actual values corresponding to them have been observed. Thus, step 4 can be performed two time slices after the first time slice for forecast t+1, but step 4 can only be performed four time slices afterwards for forecast t+2, and so on. Step 5 delays are the same as those for steps 1 through 3, as shown.

Stage Structure

A generalized stage structure is provided. Instead of the dedicated stage structure for the six stages depicted in FIG. 3 of the '874 application, therein, this generalization allows n_stages each of which could fall in an n_stage_type category. The '874 application discloses n_stage_types=6 categories: input, feature, screener kernel, correlator kernel, forecaster, and output, which might correspond to n_stage_type=0, 1, 2, 3, 4, and 5, respectively. The present embodiments may comprise those stages, among others. Each of these stages comprises a module for calculating a component function of feature value generation. More than one of each type of stage may be provided. They may be cascaded in any order.

Nested within each type of stage, n_substage_types possible categories may be included. For example, application Ser. No. 11/484,874 discloses a stage. Present embodiments could include three screener feature stage types: user-supplied, additive window, and conjunctive. Thus, n_stage_type=2 might be further broken down into n_substage_types[2]=3, having n_substage_type[2]=0, 1, and 2, respectively.

Based on this general structure, the user would be able to specify n_stages in a configuration. The stages would run sequentially. For each such stage, the user would further specify its n_stage_type, or n_substage_type. For each such selected stage type and subtype, the user would complete the specification, along the same lines that already implemented in a currently implemented Application Program Interface (API).

Graphical Deviance Display

A graphical deviance display is provided for deviance values. The subject graphical display simply converts deviance magnitude values on a two-dimensional grid. Independent values for the conversion would include deviance magnitude values, ranging from a configured positive value to a second, larger configured value. Corresponding dependent values for the conversion would be colors along a spectrum mapped on the same grid. The relationship between the magnitudes and wavelength values corresponding to the colors would be monotonically increasing, as specified by the user. In the present embodiment, the display register 152 includes a conversion circuit to map values for display.

Image Interpolation for Data Compression

During each time slice, a forecaster may produce learned parameters for forecasting image values for each among n future image time slices. Instead of transmitting each image during each time slice, an auto-adaptive process may occasionally transmit learned parameters when they have substantially changed over time slices and then intermittently transmit a reduced number of image values. When the reduced number of image values is received, a receiver interpolation process may use them and the most recently transmitted learned parameters to interpolate non-transmitted images between those that were are transmitted.

A forecaster may also treat each non-overlapping window within an image as if it were produced during consecutive time slices. During each window time slice, a forecaster may produce learned parameters for forecasting window values for each among n future window time slices. Instead of transmitting each window during each window time slice, an auto-adaptive process may occasionally transmit learned parameters when they have substantially changed over window time slices and then intermittently transmit a reduced number of window values. When the reduced number of window values is received, a receiver interpolation process may use them and the most recently transmitted learned parameters to interpolate non-transmitted windows between those that were are transmitted.

An auto-adaptive process may use also use auto-adaptive forecasting process combined with a corresponding receiver interpolation process for compressing images, as well as a second auto-adaptive forecasting process combined with a corresponding receiver interpolation process for compressing windows, in order to achieve two forms of data compression at once.

In either the image data compression or the window data compression case, or in the event that both are combined, effective data compression may be achieved by continuously learning how to interpolate between every n time slices at the sending station, transmitting every nth time slice along with learned parameters, and then interpolating at the receiving station.

Processor Environment for Producing Estimated Functions

Referring to FIGS. 4 through 20, the processing unit 24 processes input data to provide known forms of statistical functions. Embodiments of the present invention facilitate real time generation of statistical functions by the processing unit 24. Processing of large sets of data that have previously been intractable in the environment of a self-powered remote vehicle is also facilitated. The processing unit 24 may include functionality to provide selected statistical calculations. The inclusion of a particular module in the processing unit 24 is optional. The requirements for types of modules to be included in the processing unit 24 are a function of the application in which the system is employed. The particular modules included in the present illustration comprise a screener feature module 44, a screener kernel module 46, a correlator feature module 48, a correlator kernel module 50, a forecaster module 52 and an output module 54.

The operation of these modules is described with respect to FIGS. 4 through 9 respectively. A data-responsive module 60 is provided that may compare process data to criteria such as alert threshold values or event profiles. Additionally, the data-responsive module 60 may display values, and may also register imputed values, forecast values and statistics and event profiles. An input metrics circuit 70 is synchronized by a clock circuit 72 to provide inputs to the processing unit 24 comprising signals received from the sensors. The clock circuit 72 also synchronizes provision of output metric values in the module 64 for each time slice. In traditional applications, a single processing unit 24 may be provided. However, for facilitating processing of data represented by large numbers of input values, e.g., entire video frames at a nominal repetition rate, it is desirable to provide for parallel, pipelined operation utilizing a plurality of processing units 24 as further described with respect to FIG. 10.

Figure 4:
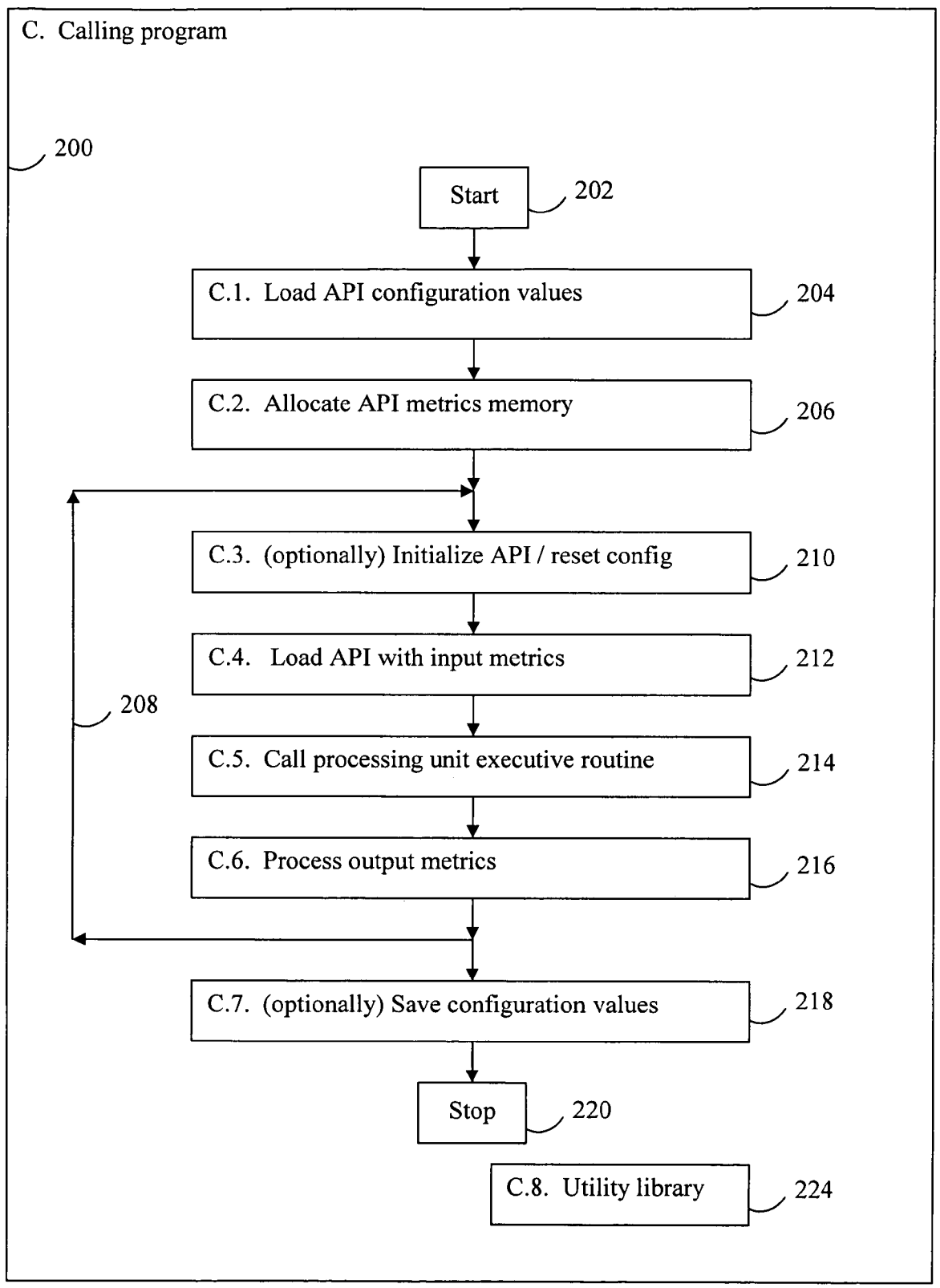

FIG. 4 is a flowchart illustrating operation of the screener and kernel module 46. While the description of operation may be described from initial startup, the present description assumes that prior time slices have already occurred and that information is already present in the various registers. This is the typical situation. A routine that operates the screener feature module 44 will be referred to as a calling program 200. The calling program 200 starts at block 202, at which configuration programs are loaded. Configuration values include, for example, the number of dimensions, here one, the number of data inputs per dimension, here 512, and the number of input metric values per data point. Where the input is total sound intensity, the number of input metrics per data point is set at one. Where a data point includes sound intensity at each of three frequencies, the number of input metrics per data point is set at three. Configuration values also include the number of screener features per data point, here set at four and the number of correlator features per data point, here set at four. At block 204, the calling program 200 allocates memory for inputs from the input metrics circuit 70.

At block 206, the program 200 locates memory cells for the API metrics. In the present illustration, allocated API memory would include memory for 512 cell metric values and their 512 corresponding plausibility values. Plausibility value as used in this description is a number between zero and one used by a rapid learning system to control the weight of an input measurement with respect to learning. In one preferred form, the calling program 200 allocates data locations for API 10 values for 512 cells, locations for 512×4 for feature output values and memory for 512×4 correlator output feature values. The program 200 enters into a loop 208 in which updates and calculations may be performed. The loop 208 begins with block 210, and ends with block 216, which may return to the block 210.

The block 210 provides the locally programmable option to modify the above-described API configuration of memory locations. At block 212, input values are loaded into the memory locations dedicated thereto, and the corresponding plausibility values are also loaded. The calling program 200, at block 214, calls the first processor program, further described with respect to FIG. 5 below, which may comprise a set of deviation values between measured and predicted values. Following, at block 216, the system decides whether to return to block 210 to repeat the process or to proceed to a block 218 at which configuration values may be stored, after which at block 220, the routine stops. Criteria that may be employed at block 216 may include whether processing of data produced during each of a preselected number of time slices has been completed. Additionally, a utility library 224 may be accessed. The library 224 includes a broad variety of display and control functions for processing data to be furnished to the output metrics module 60 (FIG. 3).

FIG. 5 is a flowchart illustrating programming and operation of the screener kernel module 46. A processing unit executive routine 240 begins at the block 242. At block 244, the processing unit executive routine 240 loads the API values accessed by the calling program 200. At block 246 the values may be organized for parallel processing in embodiments in which parallel processing is utilized. A significant factor in deciding whether to use parallel processing is the rate of arrival of new data and the period of each time slice. In a situation in which new data is arriving every 10 ns, and one processor required 75 ns to process data, then eight processors running in parallel would be needed to process data in real-time. It should be remembered that in the present context, real-time refers to processing without building up a backlog of sensor data. In the current illustration, a line of cells of 512 values is organized. Each parallel processor would process 64 cells. The processor routine would organize parallel processing by distributing sets of 64 input values and 64 plausibility values to corresponding processing modules.

At block 246, parallel output metrics are collected. Block 248 calls one or more processing units described in further detail with respect to FIG. 6. At block 252, free parallel outputs may be collected. At block 254, auto-adaptive learning memory (ALM) values are saved to a core file. At block 256, processing for a current time slice is completed, and the processing unit executive routine 240 returns to block 242 for processing during a next time slice.

Figure 6:
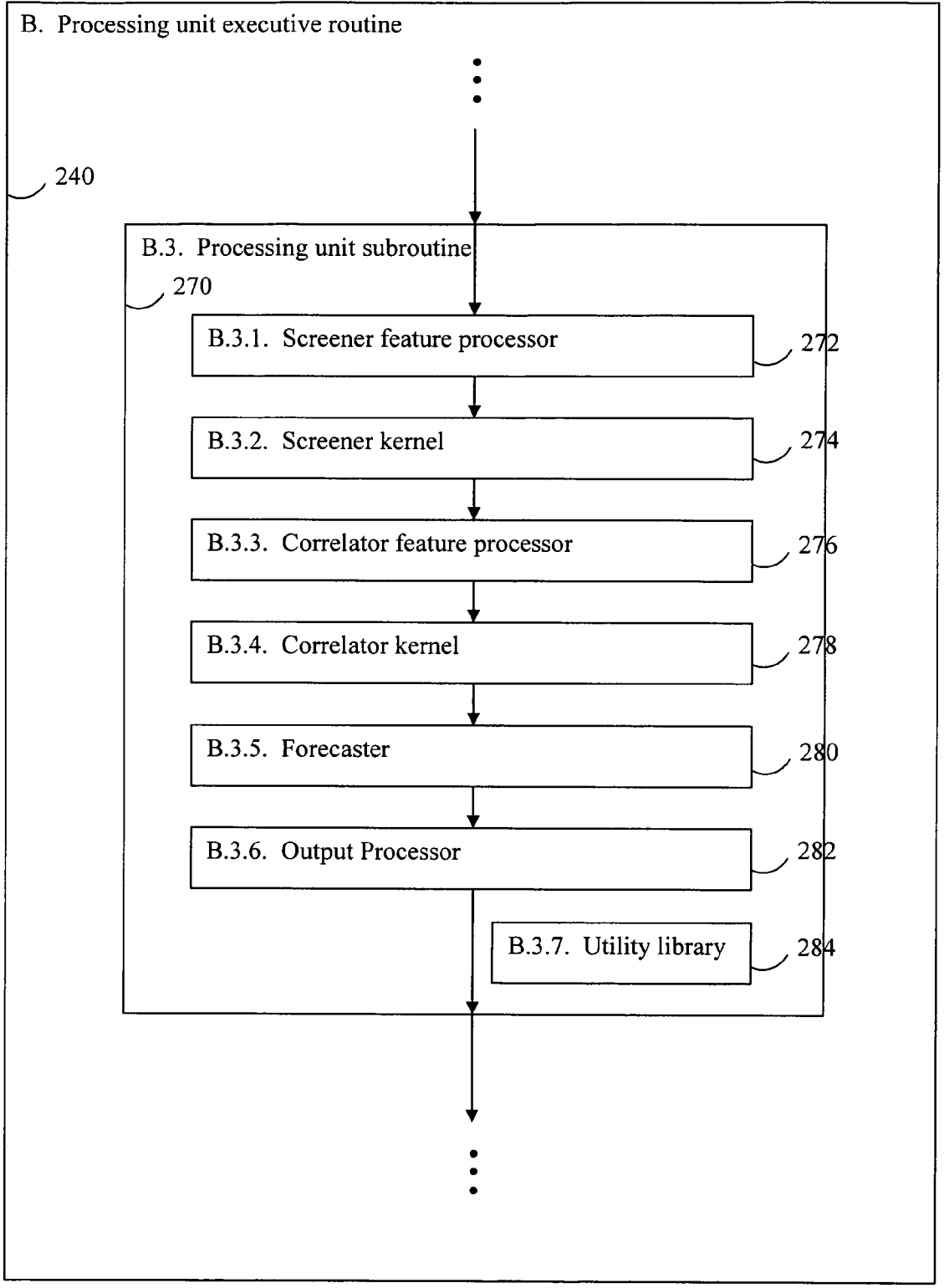

FIG. 6 is a flowchart illustrating programming and operation of a processing unit subroutine 270 which is called at block 248 in FIG. 5. The processing unit subroutine 270 begins with block 272, at which an operation performed in accordance with embodiments of the present invention and described in the present context as a window function is called. The window function is described in greater detail with respect to illustrations beginning with respect to FIG. 13 below. The windowing feature selects data from nearest data locations in time and space for calculation of values. At block 274, the screener kernel function, further described with respect to FIG. 7 below is called. At block 278, the correlator kernel function, described with respect to FIG. 8 is called. At block 280 the forecaster function may be called and at block 282, a range of output values for a current time slice is tabulated. The subroutine 272 utilizes a utility library 284.

When the screener kernel 274 is called, each feature input value for a given time slice is transformed into a deviance value. The deviance value comprises an input for the correlator feature function at block 276. When the correlator kernel 278 is called, the correlator kernel function 278 utilizes the window function to impute each current value as a function of a configurable number of nearest neighbor of values in time and space. This is explained in further detail beginning at the FIG. 13 below. At block 278, a correlation matrix is provided to the forecaster.

The forecaster function 280, when utilized, produces a forecast for each feature and each time slice, including any configurable number of future time slice forecasts. The forecaster function 280 may utilize prior art forecasting functions. While the forecasting functions are known, the forecasting output values are utilized in accordance with embodiments of the present invention to improve event recognition, including a values, deviance detection and deviance correction. Established correlational systems cannot distinguish underlining deviant values from apparent deviant values that are not in fact deviant. The present method can uniquely discount such apparently deviant values by using previously generated forecasts and to identify those apparently deviant values that are close to their forecast values, and therefore most likely are not deviant. The output processor function 282 received deviance values from the screener kernel function 274 in the correlator kernel 276 along with all ports from the forecaster function 284 for utilization in accordance with embodiments of the present convention as further described below.

Figure 7:
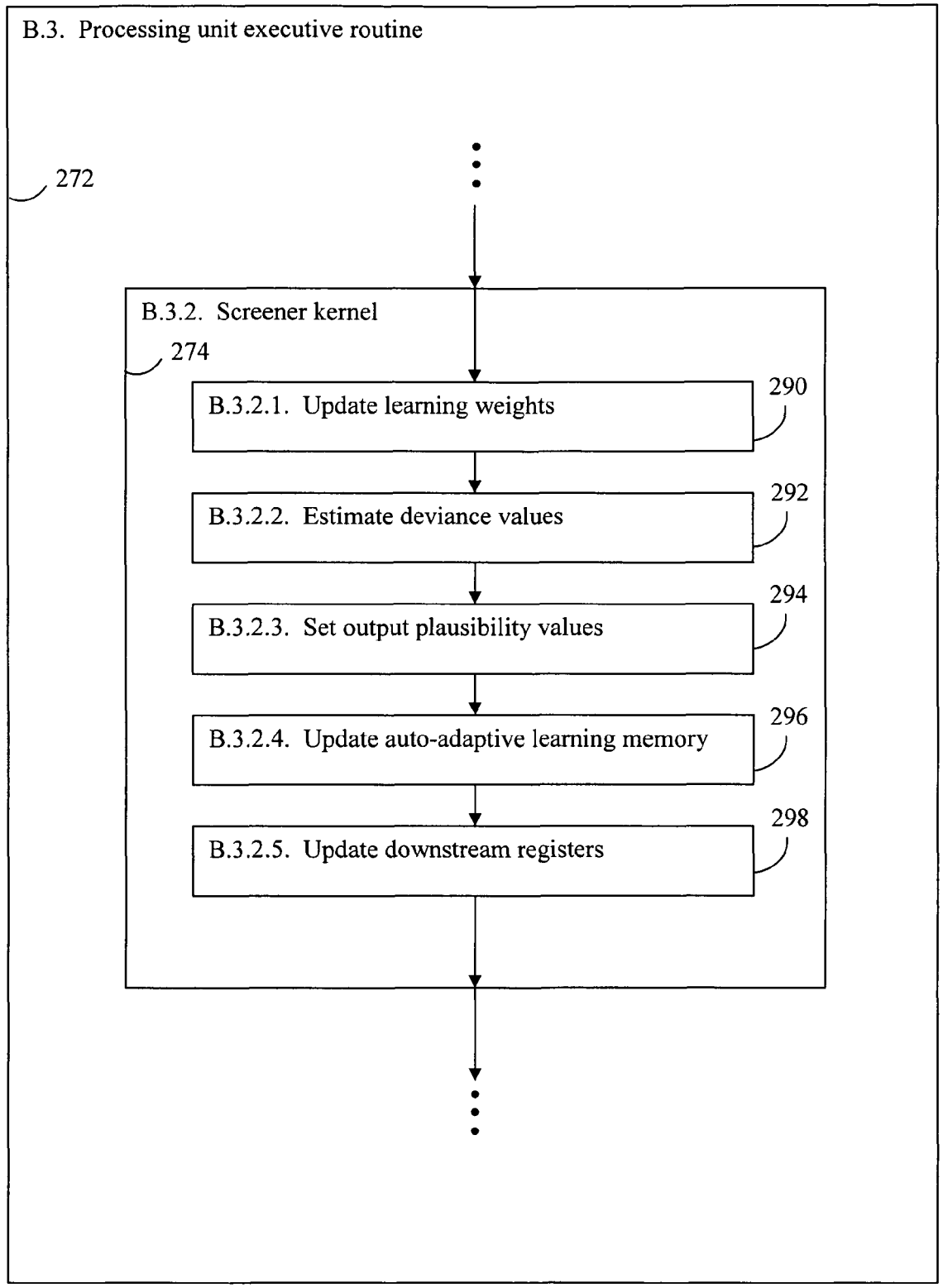
Figure 8:
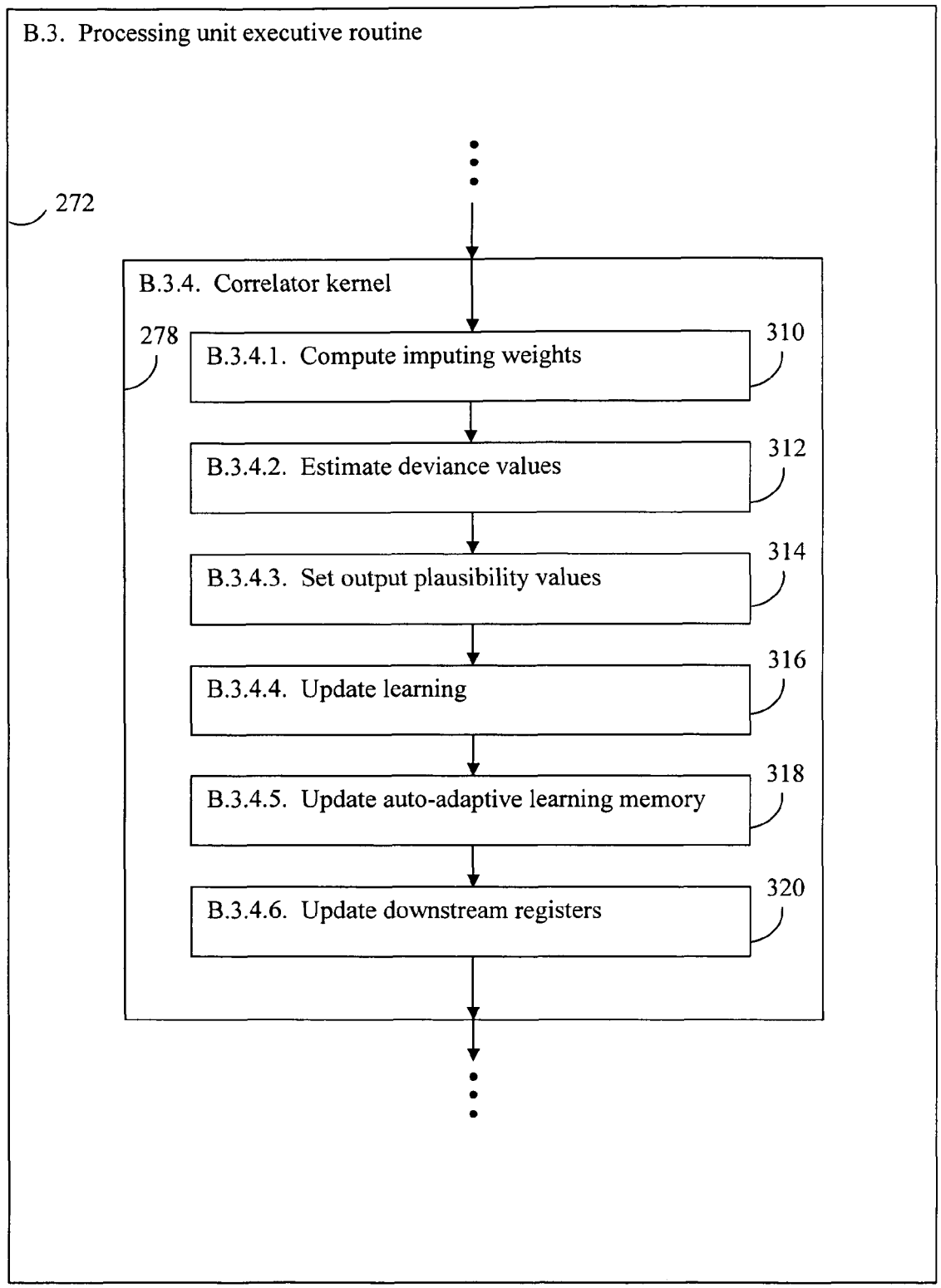

FIG. 7 is a flowchart illustrating the operation in programming of the screener kernel 274. At block 290, learning weights are updated. At block 292, deviance value estimation is performed, and an ALM updating is performed. At block 294, in accordance with embodiments of the present convention, the screener kernel function 274 provides output plausibility values for use in identifying deviant events. At block 298, downstream registers are updated. The functions at blocks 290 through 298 are separable and may be performed in parallel.

FIG. 8 is a flowchart illustrating the operation and programming of the correlator kernel 278. At block 310, imputing weights are calculated based on most recently updated correlator learned parameters. At block 312, deviance values are estimated by use of the correlator kernel 278. At block 314, output plausibility values are set utilizing the correlator kernel 278. At block 318, the ALM values are updated, and at block 320, downstream registers are updated.

Figure 9:
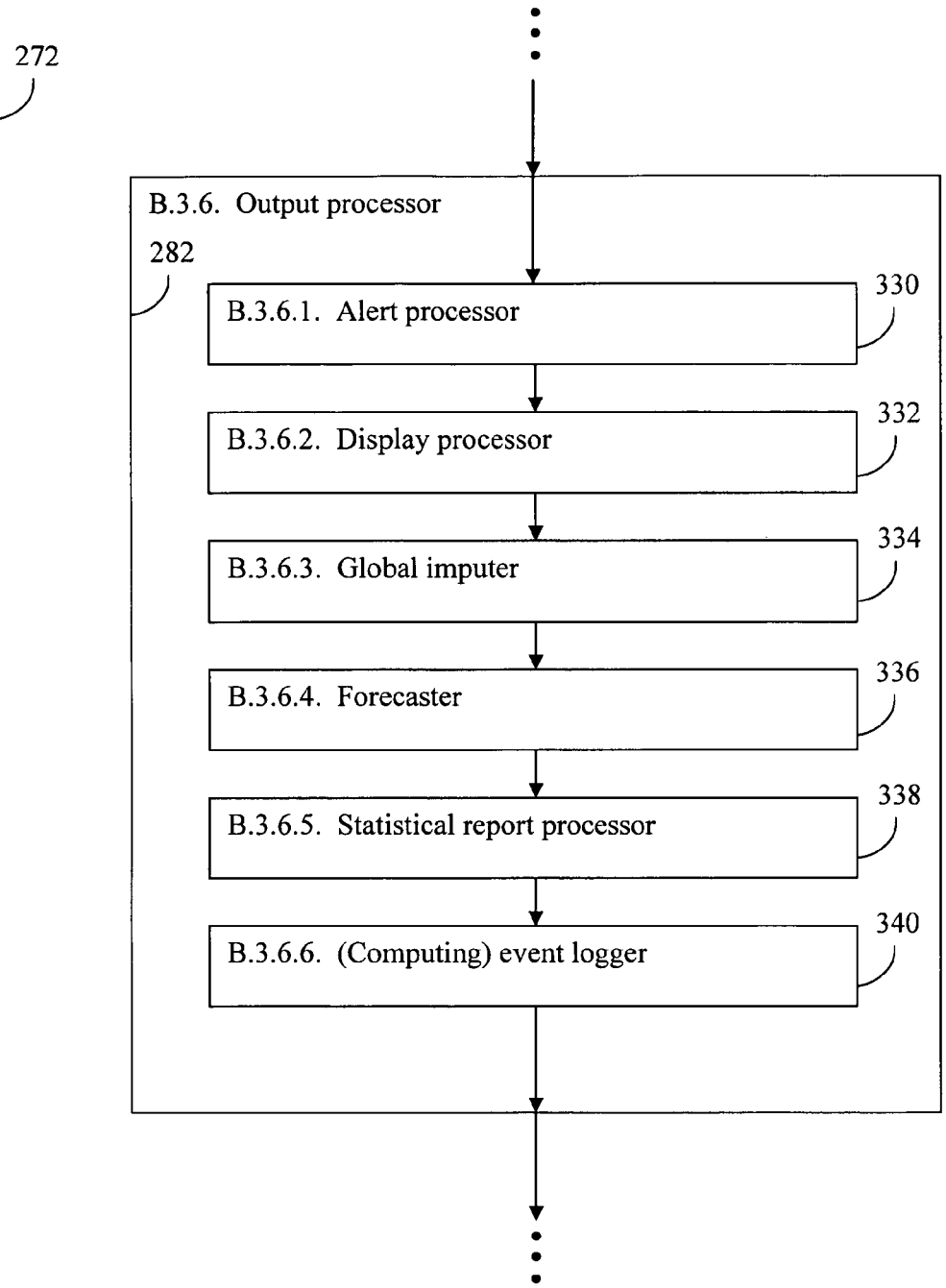

FIG. 9 is a flow chart illustrating the operation and programming of the output processor 282. At each time slice, the output processor routine 282 calls an alert processor routine 330 which provides values to the alert module 150. The alert processor module 330 utilizes deviance and plausibility values provided to it from the screener kernel module 46 and the correlator kernel 50. The alert processor routine 330 employs an easily programmable window function. The window function selects an estimation set, described with respect to FIGS. 13-17 below, for processing. The display processor routine 332 operates in a similar matter to produce outputs for graphical display. A global imputer routine 334 operates similarly to the alert processor routine 330 to produce imputed metrics. The imputer routine 334 utilizes plausibility values based on previously obtained input metrics from the data gathering routine 210 (FIG. 4). A forecaster routine 336 produces excessive outputs. A statistical report processor 45 and the event longer routine 340 produced current results and overwrite prior results.

Figure 10:
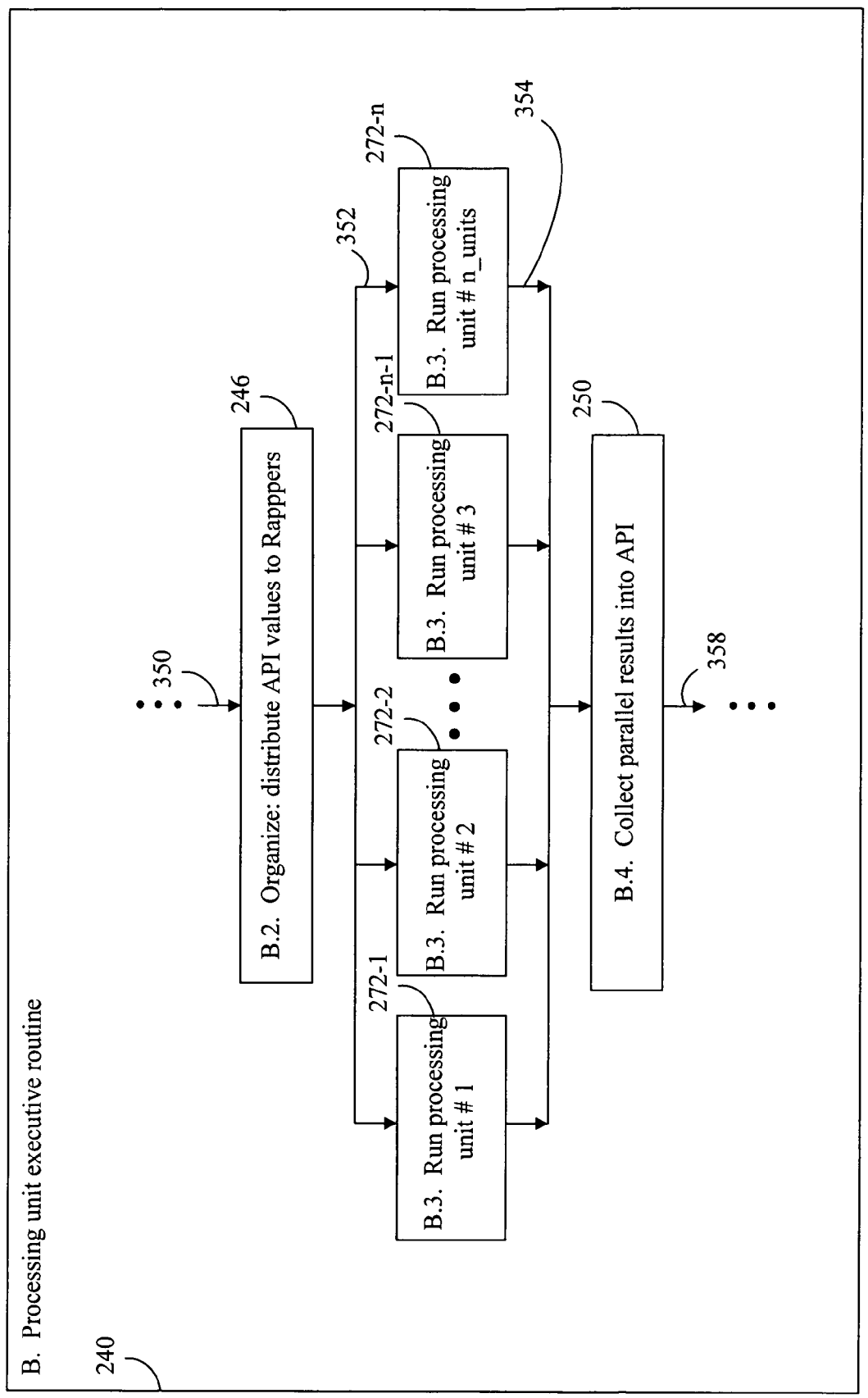
FIG. 10 is a flowchart illustrating parallel processing of generated values.

FIG. 10 is a flowchart illustrating parallel operation of the processor module of FIG. 5. During each time slice, the processing unit executive routine 240 provides the parallel processing module 246 (FIG. 5) with API values 350. At block 352, the parallel organizer 246 provides API input values including configuration parameters and input measured values along with auto-adaptive learning memory values. In block 352, values are distributed to separate processing modules. For example, the first 64 input values and their corresponding plausibility values would be supplied to module 272-1. Successive groups of 64 output values and corresponding plausibility values would be supplied to modules 2722 through 272n. In this manner, output values for an entire line are collected and at step 354 are combined and provided as collected parallel outputs and for the API at block 250. The parallel collected output processor output values 250 are received at an output 358 (FIG. 5). Consequently, operation of the multiple processing units is enabled.

Referring again to FIG. 3, operation of the processing unit 24 is described. Output signals produced during each of the number of time slices are used during a current time slice, which will be referred to as t0. The outputs being utilized during time t0 are illustrated in FIG. 11, which is a chart illustrating the signals used by each of the modules 44-60 during the time slice t0. The processing unit 24 receives the values collected during step 352 (FIG. 10). When the input measured time slices arrive sufficiently slowly so that the processing unit 24 keep up with successive inputs, the modules 44-60 could operate sequentially. Alternatively, the processing unit 24 could sense a higher data input rate as follows. At the beginning of a time slice t0, the screener feature module 44 would convert input metrics 352 (FIG. 10) for the time slice t0 into outputs of the screener feature module 44 when it sends the values into the buffer 86 for later downstream processing. Meanwhile, the screener kernel module 46 has transformed feature values from time slice t−1 based on the input metrics received in time slice t−1 into deviance values and placed the values into buffer 96 for later downstream processing.

The correlator feature module 48 provides outputs to the buffer 106. Similarly, the correlator control module 50 provides calculated outputs based on deviance values previously computed by the screener kernel module 46 at time slice t−1 and based on input metrics received in time slice t−3 into deviance values to the buffer 116. Meanwhile, the forecaster module 52 would use output values that were previously updated by the correlator kernel module 50 at time slice t−1. Based on input metrics received at time slice t−4, forecast values for time slice t−3 were produced. Optionally, additional values may be produced utilizing more time slices into the future relative to time slice t−4 and placed into the forecaster module buffer 126. Concurrently, the output module 54 would transform input values received from time slice t−5 along with output deviants and plausibility values from the screener kernel module 46 corresponding to input values received from the time slice t−5 that were completed during time slice t−4. Further, the correlator kernel output 50 input receives deviance and plausibility values corresponding to input values received at time slice t−5 that were computed during time slice t−2, and provides various output values and stores them in register 136, the future updating output metrics 358 (FIG. 10), alerts 150, displays 152, imputed values 154 and the statistics registers 158.

Figure 12:
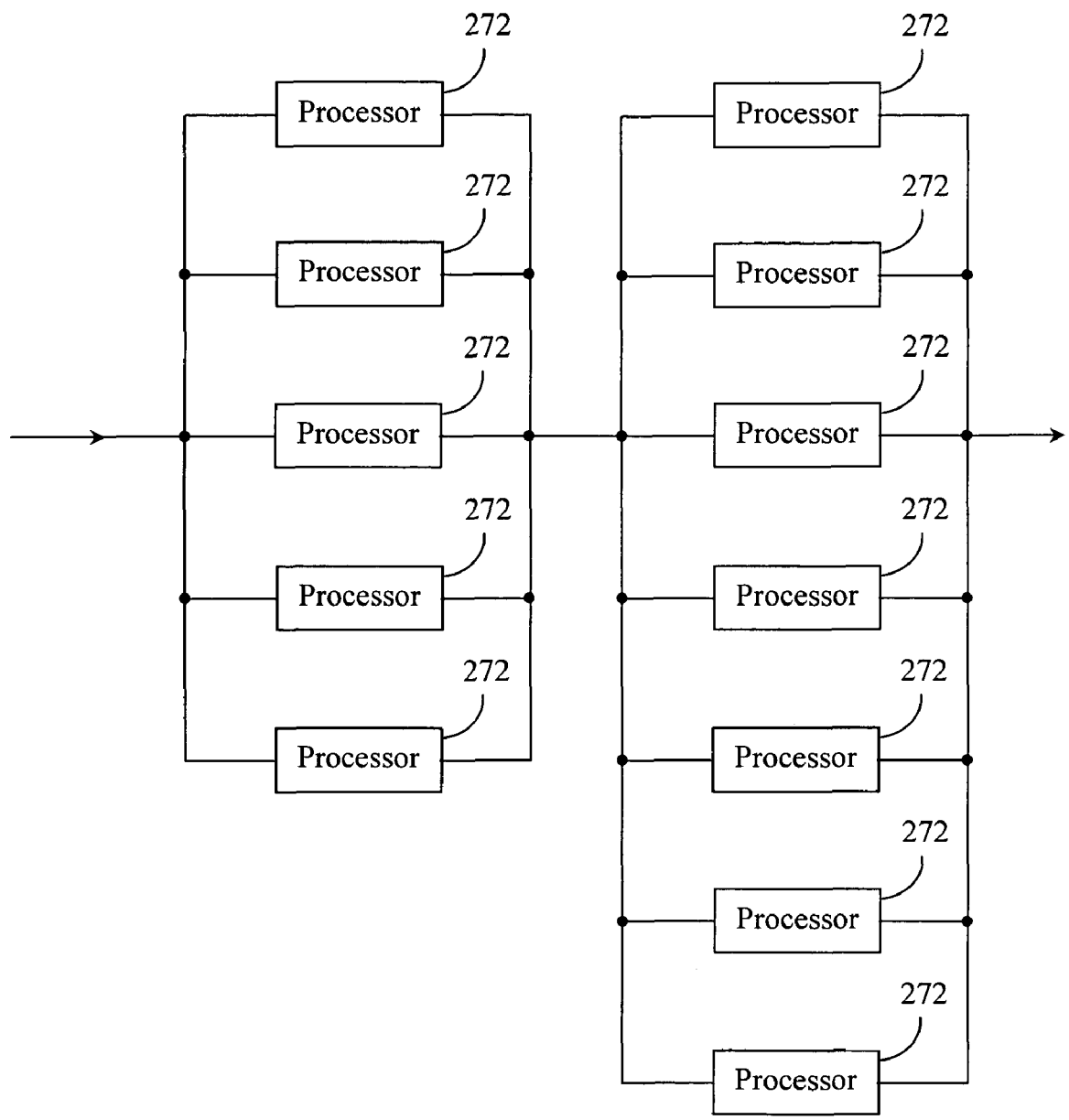
FIG. 12 is a block diagram of a parallel processor performing the routines of FIG. 10.

FIG. 12 is an illustration of a parallel, pipelined configuration for the processor 40. A group of processors 272 may be connected in parallel. Further, a plurality of such groups may be connected in series to comprise a pipeline. Daisy wheel registers, each of which can be quickly updated at the end of each time slice, may be used to embody the registers 80, 90, 100, 110, 120 and 130 (FIG. 3) when used in conjunction with buffered pipelining. By providing for parallel processing, output metrics may be produced just as quickly with one set of register hardware as with the alternative of having six distinct sets of register hardware operating in a sequential fashion. One sixth of the hardware also requires ⅙ of the logic code to be programmed.

FIGS. 13 through 17 are each a chart useful in understanding processing data sets having various numbers of temporal and spatial dimensions. Embodiments of the present invention utilize a form of "nearest neighbor" processing in order to impute expected values for particular cells. As further explained below, the processor 40 utilizes a Markov chain. A Markov chain embodies a model of sequences of events where the likelihood of an event depends only on a preceding event or a nearest neighbor event. In prediction and simulation, the principle of the Markov chain is applied to the selection of samples from a probability density function to be applied to the model. The "windowing" function described above refers to the selection of adjacent cells within selected dimensions to be processed together. By utilizing the Markov chain, reliable estimations may be made for imputed values, and the complexity, expense and time required to generate an inverse of a covariant matrix may be greatly reduced.

In each of the illustrations of FIGS. 13-17, a hypothetical situation is selected in which the sets of data describing different sorts of environments are defined. In each illustration, the environment is characterized by a number of temporal and spatial dimensions. In each case, an imputed value calculated during a current time period t0 will be described as a dependent value indicated by space D. The dependent value D is calculated as a function of independent values, indicated in each matrix location as I. The independent values I are values that are taken as having been established with respect to the cell currently being computed. Generally the independent values I will have been established for either successive time periods or successive locations. Another class of independent values I is referred to as F. These values are "frame" values. They are described separately since they are in cells which do not have an adjacent location on at least one side of the cell. In each of the illustrations below, the dependent value is calculated in terms of values obtained from two prior time slices, labeled t−2 and t−1, which are the two successive time slices preceding time t0. In each case, values are entered in a matrix wherein rows correspond to time slices t−2, t−1 and t0 respectively.

Each column corresponds to a location. For example, in FIG. 13, eight locations, labeled 0 through 7 are provided. In the illustrations of FIGS. 14-17, sixteen spatial locations are provided. The outer locations are labeled F and F, respectively corresponding to left and right frame cells respectively. In practice, the outer locations could be at left and right horizontal ends of a space. However, left and right are used here only to denote first and last locations. Other spatial relationships or non-spatial relationships could be represented. The locations between the outer frames F and F are labeled 0 through 13. In one form, frame values may be set to zero. Providing frame values allows the windowing function to select the number of "nearest neighbors" in each estimation set even when a value does not have a nearest neighbor.

In operation of embodiments of the present invention, a "windowing" function selects an appropriate set of I values from a data array to comprise a correlation matrix used to impute a D value. This set is a function of the estimation algorithm. The data array referred to here is data responded to by a system. In one preferred form, the data array is a record organized by sensors producing outputs for data points, attributes per data point and time slices. Attributes per data point may include values for each of the different features, values in each of a plurality of dimensions or other known forms of measurement. For purposes of the present description, this set is called an estimation set. As further described below, the members of an estimation set are a function of the number of attributes of a data point and the number of time slices utilized.

In one preferred from, the estimation set comprises a set of nearest neighbor values in each of N dimensions, where N is a non-negative integer. Dimensions may be spatial or temporal. More than three spatial dimensions or one temporal dimension may be utilized to characterize a data point. Indeed, in some cosmological models, there may be dozens of spatial dimensions. Where a value is measured over time, M sets of values, one from each of M successive time slots, are utilized. Commonly, M is selected to be three, representing the time slots t−2, t−1 and t. Other values may be selected. However, M=3 has been found to be a useful optimization of complexity of processing versus precision of result. Additionally, in accordance with embodiments of a preferred form of the present invention, it has been found that it may be assumed that correlations for sets including F and F may be used in the same manner as sets in the center of a data array.

FIG. 13 is representative of measurement of a value versus time but without spatial dimensions. There are eight features describing a given cell. Here, a cell is a row of data. The parameter indicated by the data in each location comprises a value that is not related to an adjacent value. In this case, in each of the columns 0 through 7, the current value at time t0 is a function of the two preceding values respectively at times t−2 and t−1 respectively.

Figure 14:
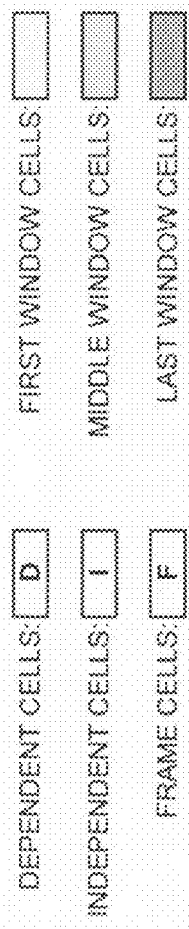

FIG. 14 represents data for a situation in which one spatial dimension is measured with respect to time. FIG. 4 may be used to represent the above-described side scan sonar application. A "window" comprising data from the three time periods of interest and the independent values surrounding a current location to be computed is selected. The window has a number of columns and rows that correspond to the estimation set. In the present illustration, each "window" will comprise the estimation set. The window will be indexed across the data matrix one step at a time so that current estimation sets are accessed and imputed values D can be calculated. The first window will include locations to F, 0 and 1. In FIG. 14, these are indicated by light shading. Successive "windows," or estimation sets, such as 0-1-2, 2-3-4, etc. will be selected in sequence. In FIG. 14, a middle window cell comprising locations 5-6-7 is illustrated. Indexing proceeds through the end of the dimension up to the last window cells, which in the present illustration are cells 12, 13 and F.

Figure 15:
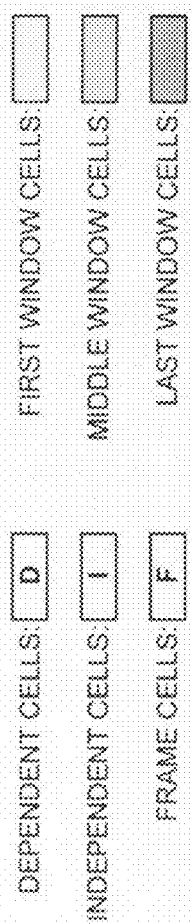

FIG. 15 illustrates a tabulation of data obtained for parameters in one spatial dimension at a given time. The rows represent space slices rather than time slices, and the columns indicate locations within each dimension. The dependent value to be imputed is calculated in terms of the preselected number of surrounding locations. In the present illustration, the estimation set consists of eight surrounding locations. These locations are the surrounding columns indicative of locations, and the two preceding rows indicative of measurements in successive dimensions.

Figure 16:
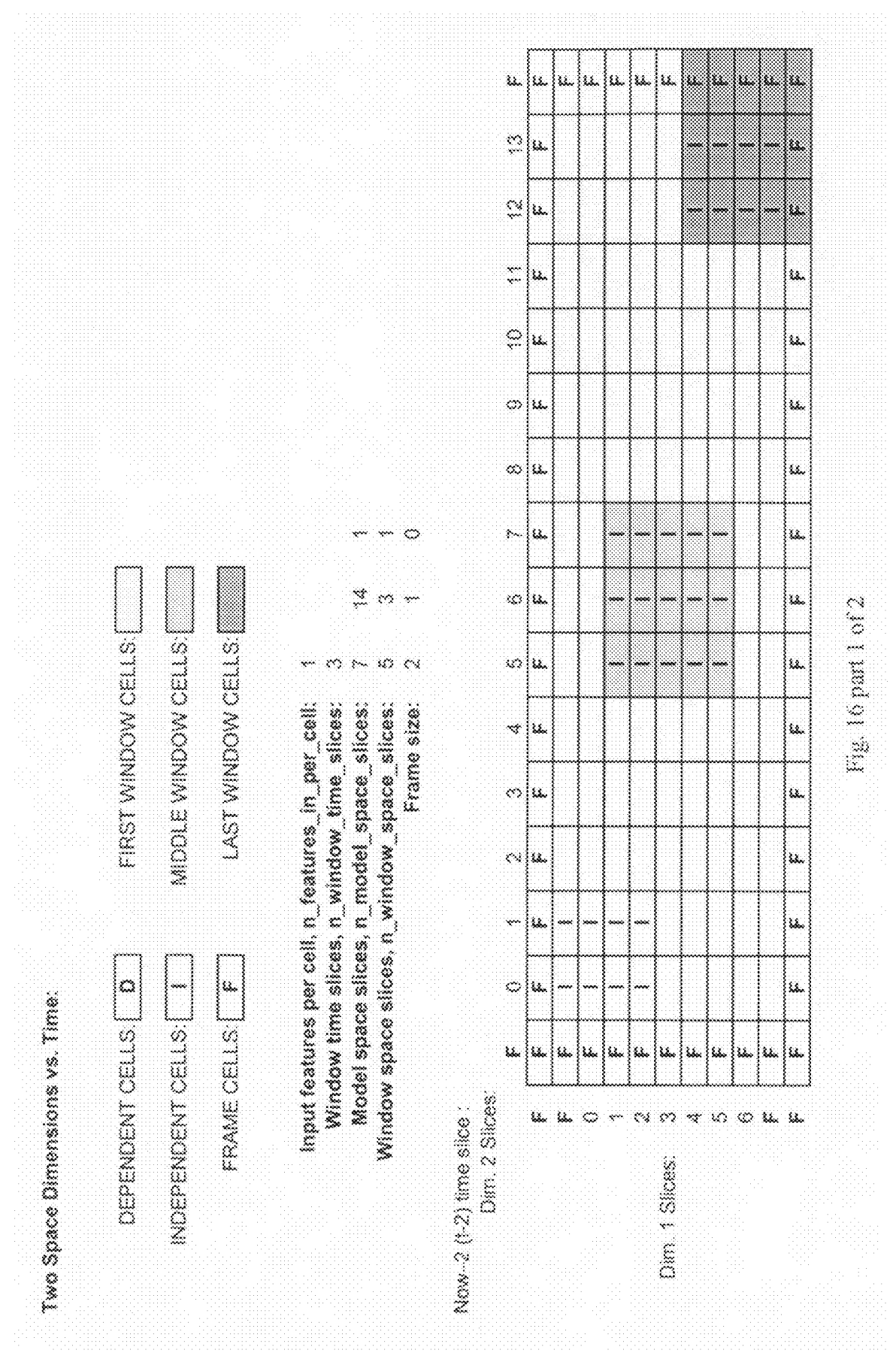
Figure 16:
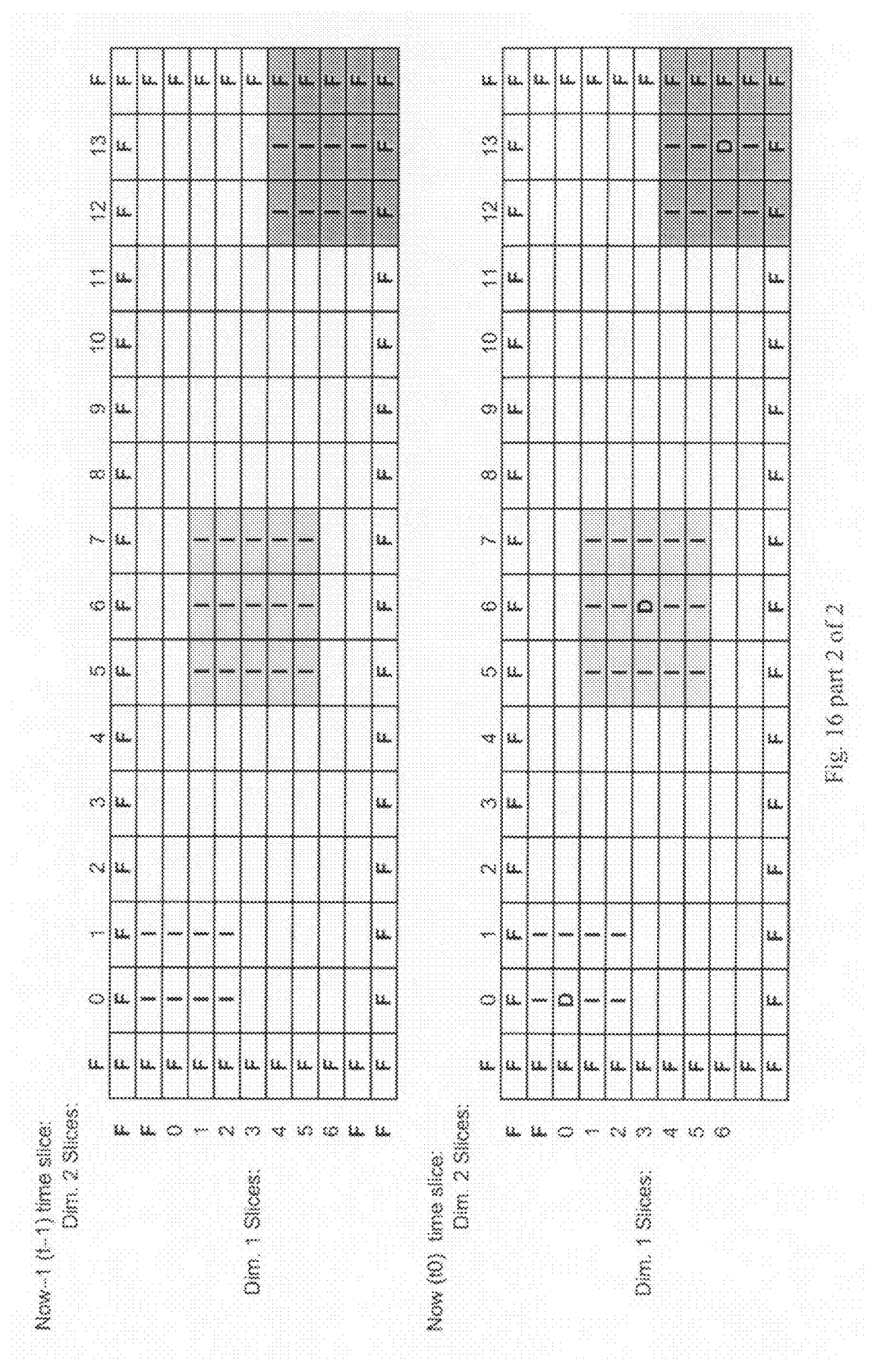

FIG. 16 consists of FIGS. 16a, 16b and 16c. The parameters measured in this illustration include one feature per cell. Each parameter is time variant and has two spatial dimensions. The estimation set includes values in two preceding time slices and in surrounding locations represented by adjacent columns. Additionally, as in FIG. 15, values and surrounding dimensions are used to calculate the imputed value. FIGS. 16a, 16b and 16c respectively represent data matrices for time slices t−2, t−1 and t0 respectively. Each independent value submatrix comprises 15 boxes. The dependent value D needs to be located between both preceding and succeeding dimensional rows.

Figure 17:
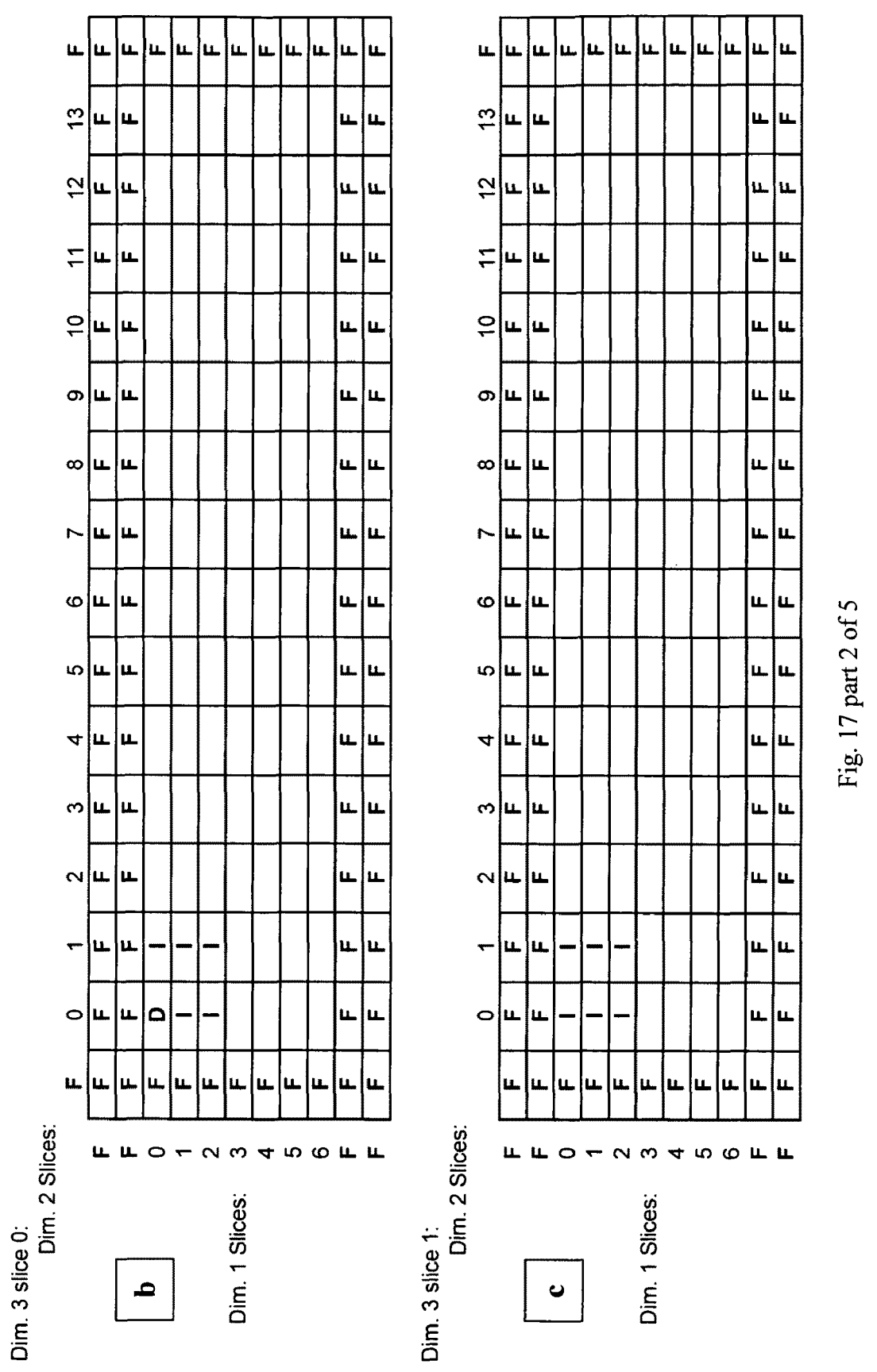
Figure 17:
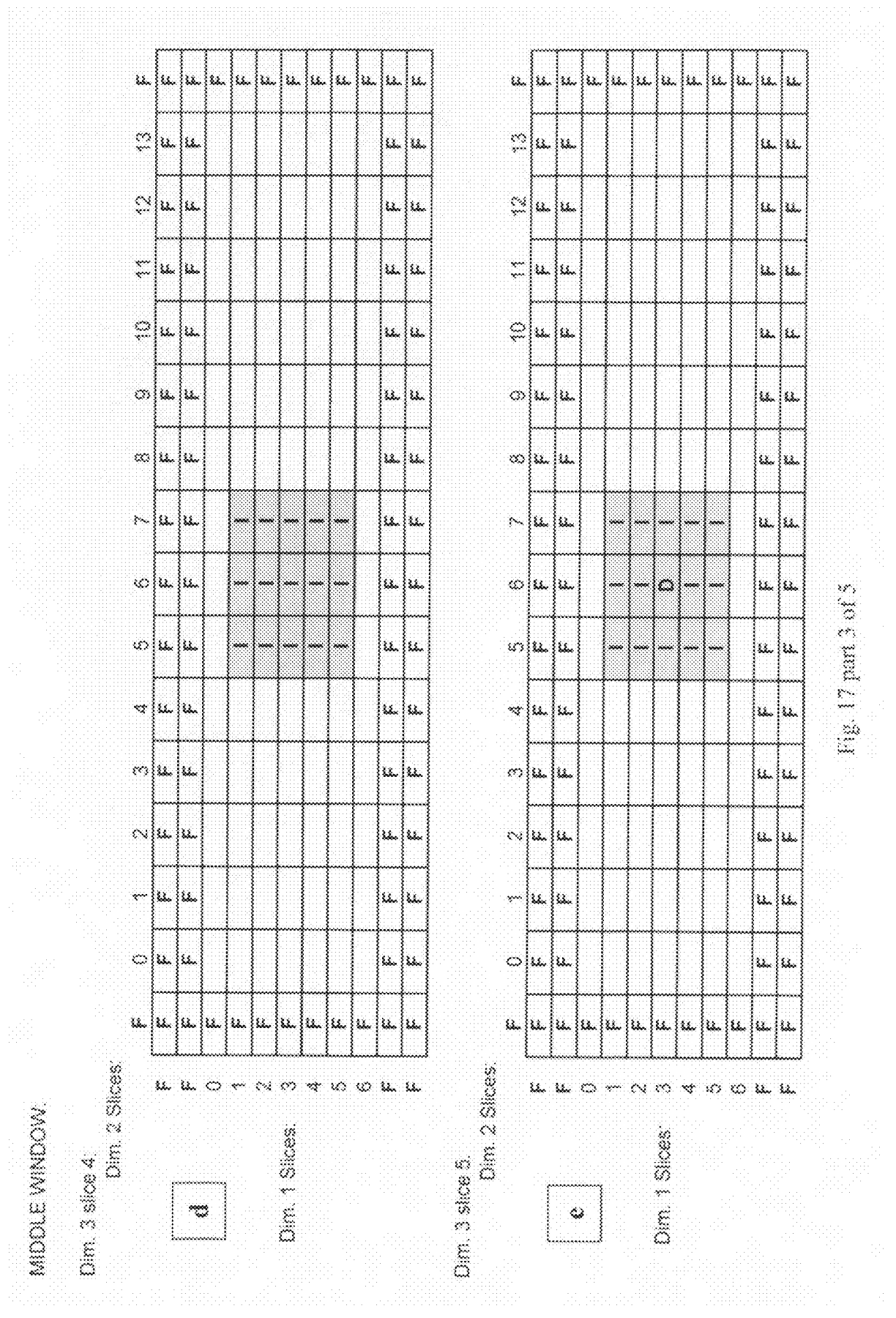

FIG. 17 consists of FIGS. 17a-17i. In this illustration, there is one feature per cell having three spatial dimensions. Three window slices representing values produced during time slices t−2, t−1 and t0 respectively. Values for a third dimension are based on measurements in two other dimensions. FIGS. 17a, 17b and 17c respectively represent initial values at the locations F, zero and 1. In these matrices, a full set of surrounding locations is not available. Full value matrices are illustrated in FIGS. 17d through 17i. An illustrative calculation is illustrated with respect to FIGS. 17d, 17e and 17f. As in the case of FIG. 16, rows surrounding the dependent value D must be included in the value matrix. Additionally, the matrices surrounding the dependent value in the third dimension must also be included. Imputed values may thus be calculated for the point in a three-dimensional space.

Figure 18:
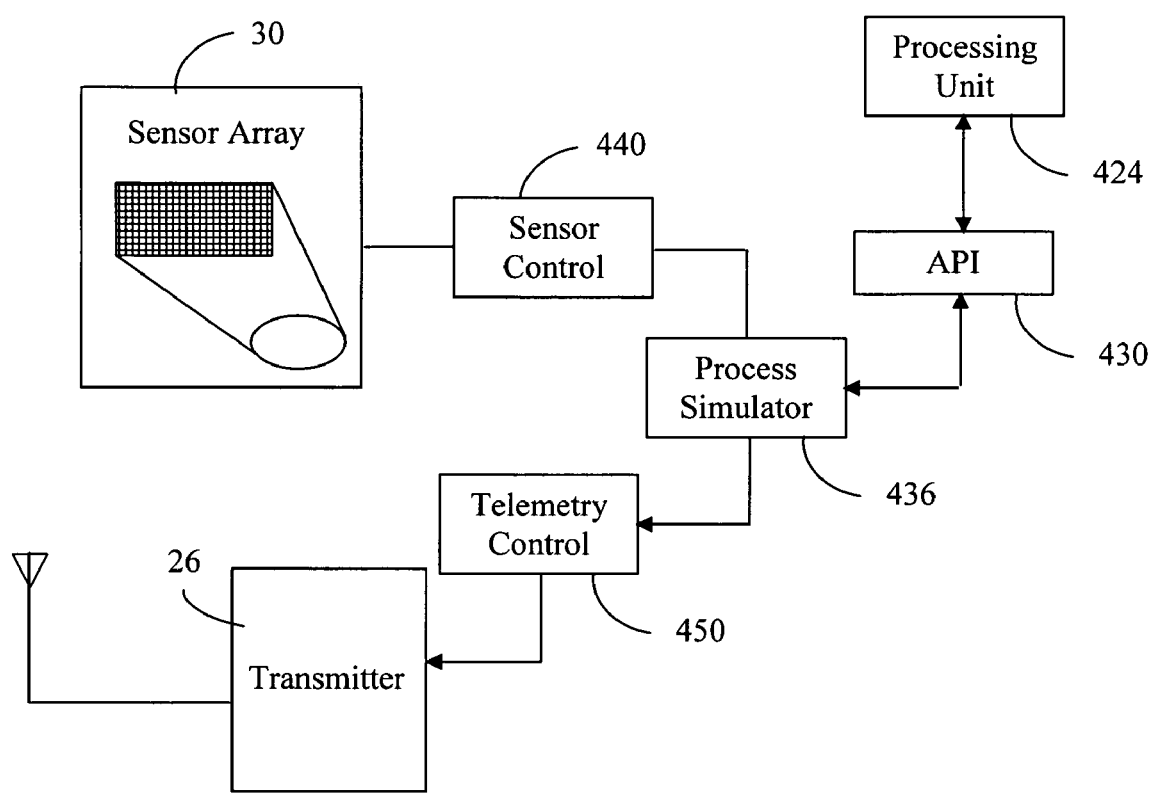
FIG. 18 is a block diagram of a processing unit interacting with an application program interface and sensors.

FIG. 18 is a block diagram of a processing unit interacting with an application program interface and sensors. FIG. 18 is a block diagram similar to FIG. 2 illustrating and electronics package 20 and sensor 30 interacting with a processing package 424. The processing package 424 has input data and output data coupled via an API 430 to a process simulator 436. A sensor control unit 440 may be coupled between the process simulator 436 and the sensor 30. The sensor control circuit 440 may adjust values for black-and-white levels, contrast and filtering functions. Additionally, a telemetry control circuit 450 may be coupled between the process simulator 436 and the transmitter 26. In one embodiment, the telemetry control 450 responds to the output matrix unit (FIG. 3) to transmit or reject selected output data.

Figure 19:
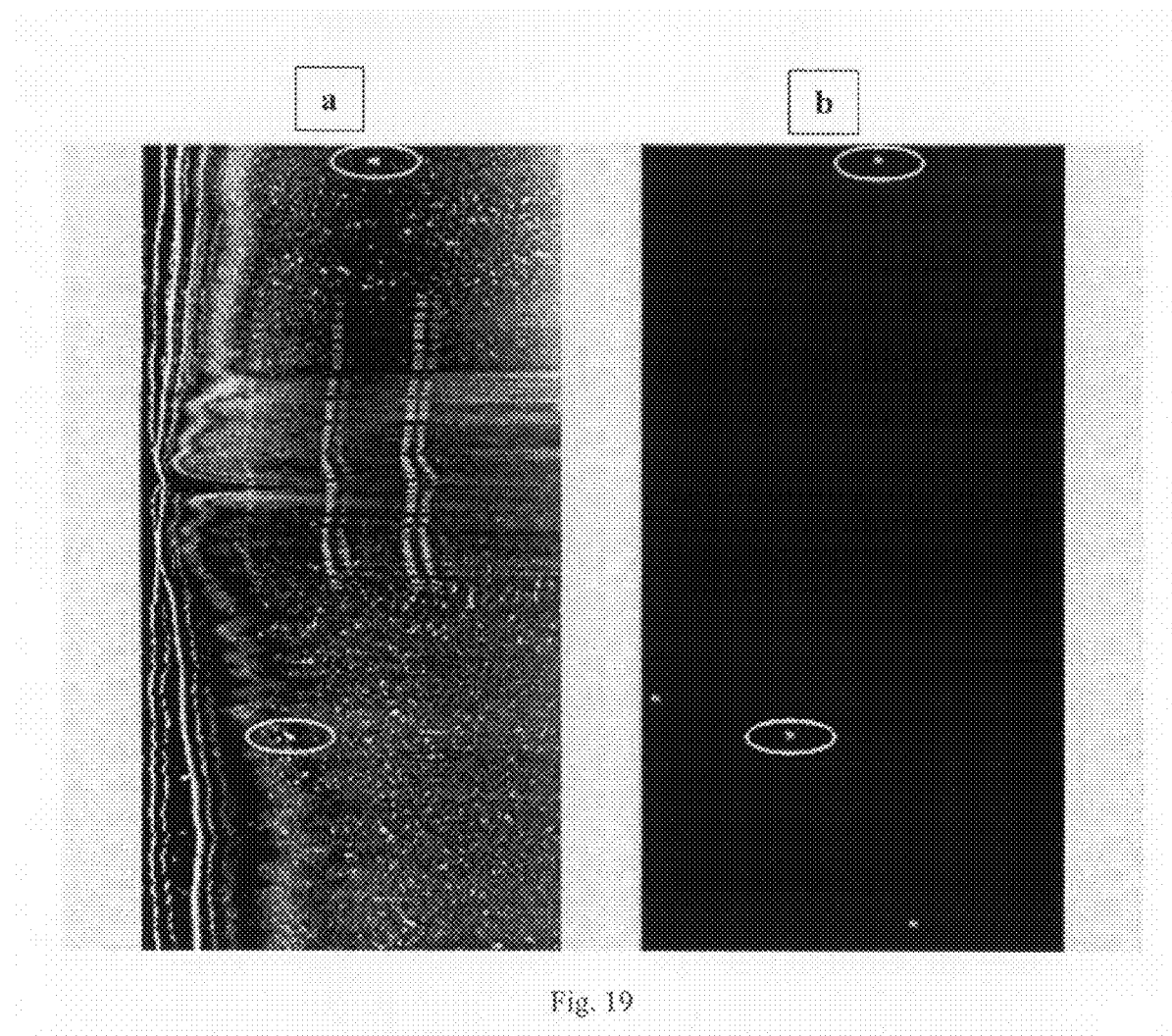
FIG. 19, consisting of FIG. 19a and FIG. 19b represents a nominal set of input information from a video camera and processed data from which clutter has been removed.

FIG. 19, consisting of FIG. 19a and FIG. 19b represents a nominal set of input information from a video camera and processed data from which clutter has been removed. FIG. 19a represents a nominal display of raw data illustrating amplitude versus wavelength of detecting video signals on an arbitrary scale. FIG. 19b represents output data as processed by the processing unit 424. Commonly, the processing routines performed by the processing unit 424 reject meaningless returns and provide out put information with minimal or no "false positive" output signals.

Figure 20:
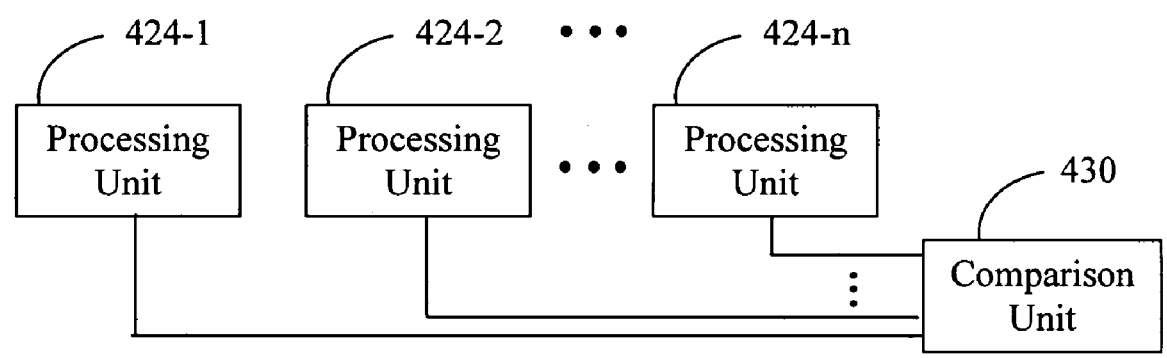
FIG. 20 is a block diagram illustrating a system utilizing a plurality of processing units, each having a different configuration.

FIG. 20 is a block diagram illustrating a system utilizing a plurality of processing units 524, 524-1, 524-2, . . . , 524-n.

Each processing unit 524 is configured differently so that efficacy of various settings may be compared. Each processing unit 524 may perform the same function, but with different settings. Periodically, for example, weekly, a comparison circuit 540 measures the relative success of each processing unit 524 in terms of a preselected criterion. For example, the preselected criterion may be smallest mean squared the deviation between actual and imputed values during the monitoring time. The most successful group of settings may be selected for processing data during a next time period. This operation may be described as convergent data fusion in that convergence of actual and imputed values may be minimized.

The present embodiments provide for separate parallel operation of calculation models. Consequently, adaptive processing may be utilized for tasks that were previously considered to be intractable in real time on hardware of the type used in low powered, portable processors. The option of modular pipelined operation simplifies programming; design and packaging, and allows for use of FPGAs in place of high-powered processors. Learned parameter usage, based on assuming that the same estimation functions and learned parameter values can be used to produce the estimates that in turn, allow unexpected events to be detected more simply. Field programmable windowed functionality can be applied to many applications by programming the data matrix to be selected by a "windowing" function. Auto-adaptive learning memory may be distributed over pipelined processing modules.

The present subject matter being thus described, it will be apparent that the same may be modified or varied in many ways. Such modifications and variations are not to be regarded as a departure from the spirit and scope of the present subject matter, and all such modifications are intended to be included within the scope of the following claims.

The invention claimed is:

1. A method of forecasting feature values in future time slices for a cell of a data array, comprising:
  generating a plurality of data cells for each time slice of a succession of time slices;
  defining a number of feature values for each data cell;
  defining a number of forecasts for each feature value;
  establishing a current time slice; and
  for each forecast:
    specifying in relation to the current time slice a future time slice for which the forecast is to be computed;
    defining at least one dependent data cell in the future time slice; and
    for each dependent data cell:
      defining an estimation set including a predetermined number of nearest neighbor cells in the current time slice surrounding in at least one spatial dimension a data cell corresponding to the at least one dependent data cell in the future time slice;
      generating learned parameters for the estimation set based on information stored in the cells of the estimation set;
      updating each learned parameter;
      computing a forecasting weight corresponding to the estimation set based on the learned parameters;
  forecasting a feature value in the future time slice as a function of the feature value associated with the estimation set and its corresponding forecasting weight; and
  further comprising specifying in relation to the current time slice at least one or more past time slices.

2. The method of claim 1, wherein the estimation set further includes data cells in at least one past slice that correspond with the nearest neighbor cells in the current time slice.

3. The method of claim 1, wherein at least one of the future time slice and the at least one past time slice are noncontiguous.

4. A method of forecasting feature values in future time slices for a cell of a data array, comprising:
    generating a plurality of data cells for each time slice of a succession of time slices;
    defining a number of feature values for each data cell;
    defining a number of forecasts for each feature value;
    establishing a current time slice; and
    for each forecast:
        specifying in relation to the current time slice a future time slice for which the forecast is to be computed;
        defining at least one dependent data cell in the future time slice; and
        for each dependent data cell:
            defining an estimation set including a predetermined number of nearest neighbor cells in the current time slice surrounding in at least one spatial dimension a data cell corresponding to the at least one dependent data cell in the future time slice;
            generating learned parameters for the estimation set based on information stored in the cells of the estimation set;
            updating each learned parameter;
            computing a forecasting weight corresponding to the estimation set based on the learned parameters;
        forecasting a feature value in the future time slice as a function of the feature value associated with the estimation set and its corresponding forecasting weight; and
    further comprising storing each forecast value.

5. A method of forecasting feature values in future time slices for a cell of a data array, comprising:
    generating a plurality of data cells for each time slice of a succession of time slices;
    defining a number of feature values for each data cell;
    defining a number of forecasts for each feature value;
    establishing a current time slice; and
    for each forecast:
        specifying in relation to the current time slice a future time slice for which the forecast is to be computed;
        defining at least one dependent data cell in the future time slice; and
        for each dependent data cell:
            defining an estimation set including a predetermined number of nearest neighbor cells in the current time slice surrounding in at least one spatial dimension a data cell corresponding to the at least one dependent data cell in the future time slice;
            generating learned parameters for the estimation set based on information stored in the cells of the estimation set;
            updating each learned parameter;
            computing a forecasting weight corresponding to the estimation set based on the learned parameters;
        forecasting a feature value in the future time slice as a function of the feature value associated with the estimation set and its corresponding forecasting weight; and
        wherein the learned parameters include mean value sum of squares cross product (MVSCP) matrix values and MVSCP inverse matrix values.

6. The method according to claim 5, wherein updating only one MVSCP matrix is required per time slice.

7. A method of forecasting feature values in future time slices for a cell of a data array, comprising:
    generating a plurality of data cells for each time slice of a succession of time slices;
    defining a number of feature values for each data cell;
    defining a number of forecasts for each feature value;
    establishing a current time slice; and
    for each forecast:
        specifying in relation to the current time slice a future time slice for which the forecast is to be computed;
        defining at least one dependent data cell in the future time slice; and
        for each dependent data cell:
            defining an estimation set including a predetermined number of nearest neighbor cells in the current time slice surrounding in at least one spatial dimension a data cell corresponding to the at least one dependent data cell in the future time slice;
            generating learned parameters for the estimation set based on information stored in the cells of the estimation set;
            updating each learned parameter;
            computing a forecasting weight corresponding to the estimation set based on the learned parameters;
        forecasting a feature value in the future time slice as a function of the feature value associated with the estimation set and its corresponding forecasting weight; and
        wherein the learned parameters include MVSCP inverse matrix values.

8. The method according to claim 7, wherein updating only one MVSCP matrix inverse is required per time slice.

9. A method of forecasting feature values in future time slices for a cell of a data array, comprising:
    generating a plurality of data cells for each time slice of a succession of time slices;
    defining a number of feature values for each data cell;
    defining a number of forecasts for each feature value;
    establishing a current time slice; and
    for each forecast:
        specifying in relation to the current time slice a future time slice for which the forecast is to be computed;
        defining at least one dependent data cell in the future time slice; and
        for each dependent data cell:
            defining an estimation set including a predetermined number of nearest neighbor cells in the current time slice surrounding in at least one spatial dimension a data cell corresponding to the at least one dependent data cell in the future time slice;
            generating learned parameters for the estimation set based on information stored in the cells of the estimation set;
            updating each learned parameter;
            computing a forecasting weight corresponding to the estimation set based on the learned parameters;
        forecasting a feature value in the future time slice as a function of the feature value associated with the estimation set and its corresponding forecasting weight; and
        wherein the learned parameters include covariance matrix values.

10. A method of forecasting feature values in future time slices for a cell of a data array, comprising:
    generating a plurality of data cells for each time slice of a succession of time slices;
    defining a number of feature values for each data cell;
    defining a number of forecasts for each feature value;
    establishing a current time slice; and for each forecast:
  specifying in relation to the current time slice a future time slice for which the forecast is to be computed;
  defining at least one dependent data cell in the future time slice; and
  for each dependent data cell:
    defining an estimation set including a predetermined number of nearest neighbor cells in the current time slice surrounding in at least one spatial dimension a data cell corresponding to the at least one dependent data cell in the future time slice;
    generating learned parameters for the estimation set based on information stored in the cells of the estimation set;
    updating each learned parameter;
    computing a forecasting weight corresponding to the estimation set based on the learned parameters;
  forecasting a feature value in the future time slice as a function of the feature value associated with the estimation set and its corresponding forecasting weight; and
  wherein the learned parameters include covariance matrix inverse values.

11. A method of forecasting feature values in future time slices for a cell of a data array, comprising:
  generating a plurality of data cells for each time slice of a succession of time slices;
  defining a number of feature values for each data cell;
  defining a number of forecasts for each feature value;
  establishing a current time slice; and
  for each forecast:
    specifying in relation to the current time slice a future time slice for which the forecast is to be computed;
    defining at least one dependent data cell in the future time slice; and
    for each dependent data cell:
      defining an estimation set including a predetermined number of nearest neighbor cells in the current time slice surrounding in at least one spatial dimension a data cell corresponding to the at least one dependent data cell in the future time slice;
      generating learned parameters for the estimation set based on information stored in the cells of the estimation set;
      updating each learned parameter;
      computing a forecasting weight corresponding to the estimation set based on the learned parameters;
    forecasting a feature value in the future time slice as a function of the feature value associated with the estimation set and its corresponding forecasting weight; and
  wherein the learned parameters include mean squared deviation values.

12. A method of generating an auto-adaptive function to forecast feature values for a cell of a data array, comprising:
  providing a plurality of stages, each stage for calculating one or more component functions, including functions to:
  receive a plurality of data cells for each time slice of a succession of time slices,
  establish a current time slice in the succession,
  define a future time slice,
  specify a number of estimations for each feature value,
  specify a dependent data cell in the future time slice for which to forecast a feature value,
  define an estimation set including a predetermined number of nearest neighbor data cells in the current time slice surrounding in at least one spatial dimension a data cell corresponding to the dependent data cell in the future time slice,
  forecast the feature value as a function of the window,
  compare the forecast feature value to its actual value to determine a magnitude of deviance;
  selecting stages for feature value generation;
  generating feature values using the selected stages; and
  further comprising operating the selected stages consecutively.

13. The method according to claim 12, further comprising selecting an order in which the selected stages operate.

14. A method of generating an auto-adaptive function to forecast feature values for a cell of a data array, comprising:
  providing a plurality of stages, each stage for calculating one or more component functions, including functions to:
  receive a plurality of data cells for each time slice of a succession of time slices,
  establish a current time slice in the succession,
  define a future time slice,
  specify a number of estimations for each feature value,
  specify a dependent data cell in the future time slice for which to forecast a feature value,
  define an estimation set including a predetermined number of nearest neighbor data cells in the current time slice surrounding in at least one spatial dimension a data cell corresponding to the dependent data cell in the future time slice,
  forecast the feature value as a function of the window,
  compare the forecast feature value to its actual value to determine a magnitude of deviance;
  selecting stages for feature value generation;
  generating feature values using the selected stages; and
  further comprising specifying in relation to the current time slice at least one past time slice, wherein the estimation set further includes data cells in at least one past slice that correspond with the nearest neighbor cells in the current time slice.

15. A method of interpolating transmitted images, the method comprising:
  receiving a plurality of data cells for each time slice of a succession of time slices,
  wherein at least one feature value is associated with each data cell;
  defining a current time slice,
  wherein the feature values associated with the plurality of data cells for the current time slice characterize a first image;
  defining a dependent cell in a future time slice;
  defining an estimation set including a predefined number of nearest neighbor cells in the current slice surrounding in at least one spatial dimension a data cell corresponding to the dependent cell in the future time slice;
  generating a set of learned parameters based on information stored in the estimation set;
  updating each learned parameter;
  transmitting the learned parameters with every nth image; and
  wherein the estimation set includes the data cells in at least one past time slice that correspond with the dependent data cell in the future time slice and the nearest neighbor cells in the current time slice.

16. A method of interpolating transmitted images, the method comprising:
  receiving a plurality of data cells for each time slice of a succession of time slices, wherein at least one feature value is associated with each data cell;
defining a current time slice,
wherein the feature values associated with the plurality of data cells for the current time slice characterize a first image;
defining a dependent cell in a future time slice;
defining an estimation set including a predefined number of nearest neighbor cells in the current slice surrounding in at least one spatial dimension a data cell corresponding to the dependent cell in the future time slice;
generating a set of learned parameters based on information stored in the estimation set;
updating each learned parameter;
transmitting the learned parameters with every nth image; and
further comprising applying the transmitted learned parameters to interpolate between successive nth images received at a receiving station.

17. A method of interpolating transmitted images, the method comprising:
receiving a plurality of data cells for each time slice of a succession of time slices,
wherein at least one feature value is associated with each data cell;
defining a current time slice,
wherein the feature values associated with the plurality of data cells for the current time slice characterize a first image;
defining a dependent cell in a future time slice;
defining an estimation set including a predefined number of nearest neighbor cells in the current slice surrounding in at least one spatial dimension a data cell corresponding to the dependent cell in the future time slice;
generating a set of learned parameters based on information stored in the estimation set;
updating each learned parameter;
transmitting the learned parameters with every nth image; and
further comprising:
computing a forecasting weight based on a learned parameter; and
forecasting a feature value of the dependent data cell n slices into in the future using the forecasting weight.

* * * * *